US012547270B2

(12) United States Patent
Song et al.

(10) Patent No.: US 12,547,270 B2
(45) Date of Patent: Feb. 10, 2026

(54) DISPLAY DEVICE

(71) Applicant: SAMSUNG DISPLAY CO., LTD., Yongin-si (KR)

(72) Inventors: Heerim Song, Yongin-si (KR); Cheol-Gon Lee, Yongin-si (KR); Mukyung Jeon, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/534,995

(22) Filed: Dec. 11, 2023

(65) Prior Publication Data

US 2024/0281091 A1  Aug. 22, 2024

(30) Foreign Application Priority Data

Feb. 21, 2023  (KR) .................. 10-2023-0022679

(51) Int. Cl.
| | |
|---|---|
| *G06F 3/041* | (2006.01) |
| *G06F 3/042* | (2006.01) |
| *G06F 3/044* | (2006.01) |
| *G06V 40/13* | (2022.01) |
| *G09G 3/3233* | (2016.01) |

(52) U.S. Cl.
CPC ........ *G06F 3/04166* (2019.05); *G06F 3/0412* (2013.01); *G06F 3/042* (2013.01); *G06V 40/1318* (2022.01); *G09G 3/3233* (2013.01); *G09G 2300/0426* (2013.01);
(Continued)

(58) Field of Classification Search
CPC .... G06F 3/04166; G06F 3/0412; G06F 3/042; G06F 3/0416; G06F 3/04164; G06V 40/1318; G09G 3/3233; G09G 2300/0426; G09G 2300/0819; G09G 2300/0842; G09G 2310/08; G09G 2354/00; G09G 3/3266;
(Continued)

(56) References Cited

U.S. PATENT DOCUMENTS

| | | | | |
|---|---|---|---|---|
| 2010/0097334 A1* | 4/2010 | Choi | ................ | G06F 3/0412 |
| | | | | 345/173 |
| 2015/0348504 A1* | 12/2015 | Sakariya | ............ | G09G 3/2092 |
| | | | | 345/82 |

(Continued)

FOREIGN PATENT DOCUMENTS

KR   10-2023-0046388   4/2023

OTHER PUBLICATIONS

Taisuke Kamada et al., "OLED display incorporating organic photodiodes for fingerpring imaging", J Soc Inf Display, 2019; 27: 361-371.

*Primary Examiner* — Md Saiful A Siddiqui
(74) *Attorney, Agent, or Firm* — F. CHAU & ASSOCIATES, LLC

(57) ABSTRACT

A display device includes a plurality of pixels, each of which includes a light emitting element, a plurality of sensors, each of which includes a light sensing element and a sensor driving circuit, and a readout circuit that receives a sensing signal output from the plurality of sensors. The plurality of sensors includes first row light sensing anodes positioned in a first row, second row light sensing anodes positioned in a second row, and an anode connection line that electrically connects y light sensing anodes among the first row light sensing anodes and the second row light sensing anodes with each other, where y is a positive integer.

20 Claims, 20 Drawing Sheets

(52) U.S. Cl.
CPC .............. *G09G 2300/0819* (2013.01); *G09G 2300/0842* (2013.01); *G09G 2310/08* (2013.01); *G09G 2354/00* (2013.01)

(58) Field of Classification Search
CPC ........ H10K 59/40; H10K 59/12; H10K 59/60; A61B 5/021
See application file for complete search history.

(56) References Cited

U.S. PATENT DOCUMENTS

| | | | |
|---|---|---|---|
| 2019/0094590 A1* | 3/2019 | Aoki | G09G 3/36 |
| 2020/0219948 A1* | 7/2020 | Kim | H10K 59/65 |
| 2020/0319731 A1* | 10/2020 | Yeke Yazdandoost | H10K 59/40 |
| 2021/0083221 A1* | 3/2021 | Lee | H10K 59/1201 |
| 2021/0158751 A1* | 5/2021 | Cha | H10K 65/00 |
| 2021/0201767 A1* | 7/2021 | Park | G09G 3/32 |
| 2021/0326558 A1* | 10/2021 | Lee | G06V 40/1318 |
| 2022/0020947 A1* | 1/2022 | Park | H10K 71/00 |
| 2022/0107717 A1* | 4/2022 | Lee | A61B 5/6898 |
| 2023/0098891 A1 | 3/2023 | Song et al. | |
| 2023/0111103 A1* | 4/2023 | Qin | H01L 25/0753 257/79 |
| 2023/0196962 A1* | 6/2023 | Cheng | G06V 40/13 382/124 |
| 2024/0331635 A1* | 10/2024 | Zhang | G09G 3/3233 |

\* cited by examiner

DISPLAY DEVICE

CROSS-REFERENCE TO RELATED APPLICATIONS

This application claims priority under 35 U.S.C. § 119 to Korean Patent Application No. 10-2023-0022679, filed on Feb. 21, 2023 in the Korean Intellectual Property Office, the disclosure of which is incorporated by reference herein in its entirety.

TECHNICAL FIELD

Embodiments of the present disclosure relate to a display device capable of recognizing biometric information and recognizing a touch.

DISCUSSION OF RELATED ART

A display device may provide various functions to a user such as, for example, displaying an image and detecting a user input. A display device may include biometric information detection function. Biometric information recognition schemes include a capacitive scheme that detects a change in capacitance between electrodes, an optical scheme that detects incident light by using an optical sensor, and an ultrasonic scheme that detects vibration by using a piezoelectric material or the like.

SUMMARY

Embodiments of the present disclosure provide a display device including a sensor capable of detecting biometric information.

Embodiments of the present disclosure provide a display device including a sensor capable of detecting both biometric information and a touch.

According to an embodiment, a display device includes a plurality of pixels, each of which includes a light emitting element, a plurality of sensors, each of which includes a light sensing element and a sensor driving circuit, and a readout circuit that receives a sensing signal output from the plurality of sensors. The plurality of sensors includes a plurality of first row light sensing anodes positioned in a first row, a plurality of second row light sensing anodes positioned in a second row, and an anode connection line that electrically connects y light sensing anodes among the first row light sensing anodes and the second row light sensing anodes with each other, where y is a positive integer.

In an embodiment, the first row light sensing anodes may be spaced apart from each other in a first direction. The second row light sensing anodes may be spaced apart from each other in a second direction which crosses the first direction. The first row light sensing anodes and the second row light sensing anodes may be spaced apart from each other in the second direction.

In an embodiment, the plurality of pixels may include first anodes, second anodes, and third anodes. The first anodes and the second anodes may be positioned between the first row light sensing anodes in the first direction. The second anodes may be positioned between the first row light sensing anodes and the second row light sensing anodes in the second direction.

In an embodiment, the sensor driving circuit of each of the plurality of sensors may include a reset transistor connected between a reset voltage line and a corresponding one among the first row light sensing anodes and the second row light sensing anodes.

According to an embodiment, a display device includes a plurality of pixels, each of which includes a light emitting element, a plurality of sensors, each of which includes a light sensing element, a first driver that provides a plurality of scan signals to the plurality of pixels, a second driver that outputs a group sensor signal, and a switching circuit that respectively provides the plurality of scan signals to the plurality of sensors during a first mode and provides the group sensor signal to the plurality of sensors during a second mode.

In an embodiment, the plurality of scan signals may be different from each other. The group sensor signal may be identical to one of the plurality of scan signals.

In an embodiment, the switching circuit may respectively provide the plurality of scan signals to the plurality of sensors in response to a first enable signal, and may provide the group sensor signal to the plurality of sensors in response to a second enable signal.

In an embodiment, the switching circuit may include a plurality of switches respectively corresponding to the plurality of sensors. The plurality of switches may include a first switch that provides a corresponding scan signal among the plurality of scan signals to a corresponding sensor among the plurality of sensors in response to the first enable signal and a second switch that provides the group sensor signal to a corresponding sensor among the plurality of sensors in response to the second enable signal.

In an embodiment, a frequency of the group sensor signal may be equal to a frequency of each of the plurality of scan signals.

In an embodiment, during a third mode, the switching circuit may provide the group sensor signal to one of the plurality of sensors.

In an embodiment, during the third mode, a frequency of the group sensor signal may be higher than a frequency of each of the plurality of scan signals.

In an embodiment, the first mode may be a fingerprint sensing mode for sensing a fingerprint of a user, the second mode may be a blood pressure sensing mode for measuring blood pressure of the user, and the third mode may be a touch sensing mode for sensing a touch of the user.

In an embodiment, the display device may further include a third driver that outputs a touch sensor signal during a third mode. During the third mode, the switching circuit may provide the touch sensor signal to one of the plurality of sensors.

In an embodiment, during the third mode, a frequency of the touch sensor signal may be higher than a frequency of each of the plurality of scan signals.

In an embodiment, the display device may further include a display panel divided into a display area and a non-display area. The plurality of pixels and the plurality of sensors may be positioned in the display area of the display panel. The first driver, the second driver, and the switching circuit may be positioned in the non-display area of the display panel.

In an embodiment, the plurality of sensors may include a plurality of first row light sensing anodes positioned in a first row, and a plurality of second row light sensing anodes positioned in a second row. At least two of the first row light sensing anodes may be electrically connected through a first anode connection line. At least two of the second row light sensing anodes may be electrically connected through a second anode connection line.

According to an embodiment, a display device includes a plurality of pixels, each of which includes a light emitting element, a plurality of sensors, each of which includes a light sensing element and a sensor driving circuit, and a first driver that provides a plurality of scan signals to the plurality of pixels, a second driver that outputs a group sensor signal, and a switching circuit that outputs the plurality of scan signals as a plurality of sensor scan signals during a first mode and outputs the group sensor signal as the plurality of sensor scan signals during a second mode. The sensor driving circuit of each of the plurality of sensors outputs a sensing signal corresponding to photocharges generated by the light sensing element in response to a corresponding one among the plurality of sensor scan signals.

In an embodiment, the plurality of scan signals may be different from each other. The group sensor signal may be identical to one of the plurality of scan signals.

In an embodiment, the sensor driving circuit of each of the plurality of sensors may include a first transistor connected between a reset voltage line and a first sensing node, a second transistor connected between a sensor driving voltage line and a second sensing node and including a gate electrode connected to the first sensing node, and a third transistor connected between the second sensing node and a readout line and including a gate electrode that receives a corresponding one among the plurality of sensor scan signals. An anode of the light sensing element may be connected to the first sensing node.

In an embodiment, the plurality of sensors may include a first sensor and a second sensor. The first sensing node of the first sensor and the first sensing node of the second sensor may be connected in common.

BRIEF DESCRIPTION OF THE DRAWINGS

The above and other objects and features of the present disclosure will become more apparent by describing in detail embodiments thereof with reference to the accompanying drawings.

DETAILED DESCRIPTION

Figure 1:
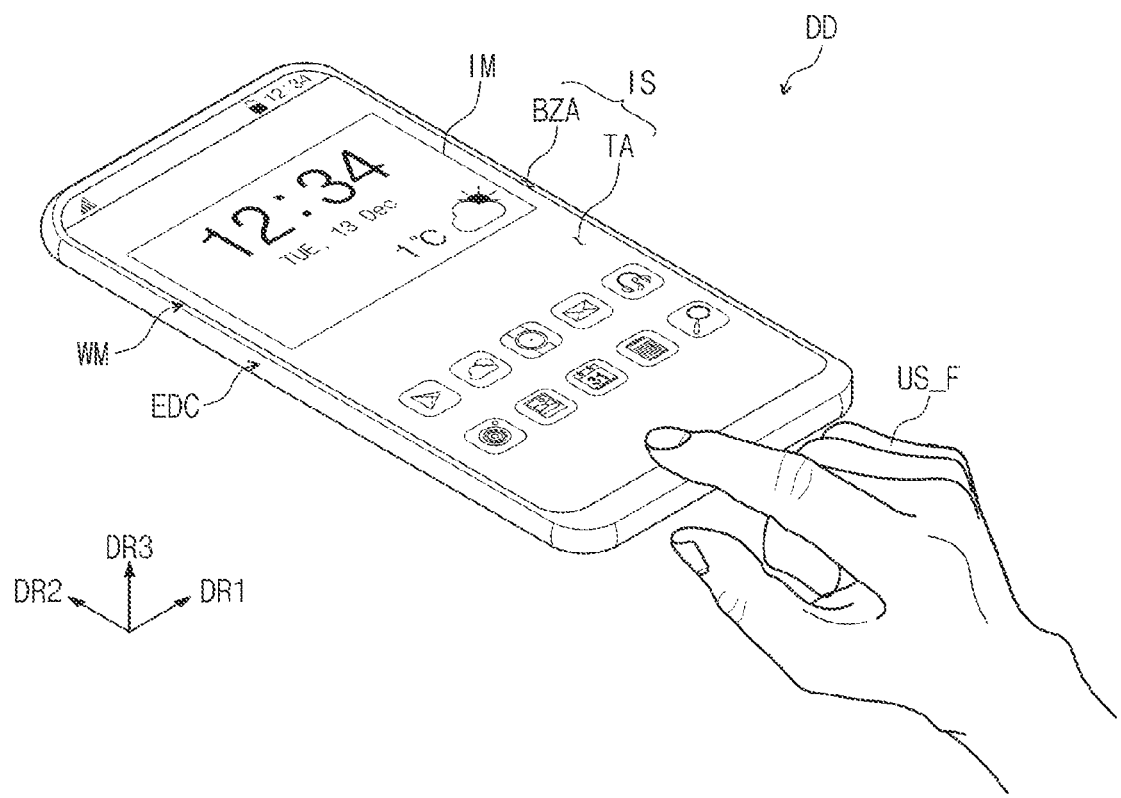
FIG. 1 is a perspective view of a display device, according to an embodiment of the present disclosure.

Embodiments of the present disclosure will be described more fully hereinafter with reference to the accompanying drawings. Like reference numerals may refer to like elements throughout the accompanying drawings.

It will be understood that when a component such as a film, a region, a layer, etc., is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words used to describe the relationships between components should be interpreted in a like fashion.

The term "and/or" includes one or more combinations of the associated listed items.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component.

The articles "a," "an," and "the" are singular in that they have a single referent, but the use of the singular form in the specification should not preclude the presence of more than one referent.

Spatially relative terms, such as "beneath", "below", "lower", "under", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Figure 2:
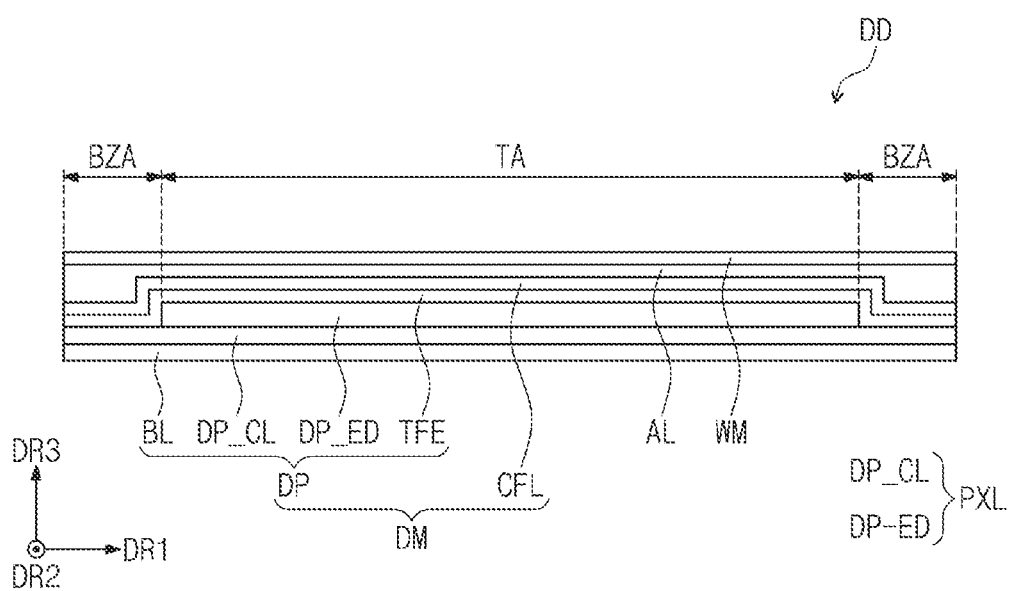
FIG. 2 is a cross-sectional view of a display device, according to an embodiment of the present disclosure.

FIG. 1 is a perspective view of a display device DD, according to an embodiment of the present disclosure. FIG. 2 is a cross-sectional view of the display device DD, according to an embodiment of the present disclosure.

Referring to FIGS. 1 and 2, the display device DD may be a device activated depending on an electrical signal. For example, the display device DD may be a mobile phone, a tablet PC, a car navigation system, a game console, or a wearable device, but is not limited thereto. FIG. 1 illustrates that the display device DD is a mobile phone.

In addition, although the rigid-type display device DD in a form of a bar is illustrated in FIG. 1, the display device DD is not particularly limited thereto. For example, the display device DD may be a foldable, rollable, or slideable display device DD.

A top surface of the display device DD may be defined as a display surface IS, and may have a plane defined by a first direction DR1 and a second direction DR2. Images IM generated by the display device DD may be provided to a user through the display surface IS. Hereinafter, a normal direction substantially perpendicular to a plane defined by the first direction DR1 and the second direction DR2 is defined as a third direction DR3. In the specification, the meaning of "when viewed from above a plane" may mean "when viewed in the third direction DR3". That is, the plane may be parallel to a plane defined by the first and second directions DR1 and DR2.

The display surface IS may be divided into a transmission area TA and a bezel area BZA. The transmission area TA may be an area in which the images IM are displayed. The user visually perceives the images IM through the transmission area TA. In an embodiment, the transmission area TA is illustrated in the shape of a quadrangle whose corners are rounded. However, this is illustrated only as an example. For example, the transmission area TA may have various shapes according to various embodiments.

The bezel area BZA is adjacent to the transmission area TA. The bezel area BZA may have a predetermined color. The bezel area BZA may surround the transmission area TA. Accordingly, the shape of the transmission area TA may be substantially defined by the bezel area BZA. However, this is illustrated only as an example. For example, the bezel area BZA may be disposed adjacent to only one side of the transmission area TA or may be omitted according to various embodiments.

The display device DD may sense an external input applied from outside of the display device DD. The external input may include various types of inputs that are provided from outside of the display device DD. For example, as well as a contact by a part of a body such as the user's hand US_F, the external input may include an external input (e.g., hovering) applied when the user's hand US_F approaches the display device DD or is adjacent to the display device DD within a predetermined distance. In addition, the external input may have various types such as, for example, force, pressure, temperature, light, and the like. The external input may be provided by a separate device, for example, an active pen or a digitizer pen. Moreover, the display device DD may detect the user's biometric information applied from outside of the display device DD.

The appearance of the display device DD may be composed of a window WM and housing EDC. For example, the window WM and the housing EDC may be coupled to each other, and other components of the display device DD, for example, a display module DM, may be accommodated therein.

A front surface of the window WM defines the display surface IS of the display device DD. The window WM may include an optically transparent insulating material. For example, the window WM may include glass or plastic. The window WM may include a multi-layer structure or a single layer structure. For example, the window WM may include a plurality of plastic films bonded to each other by an adhesive or may have a glass substrate and a plastic film bonded to each other by an adhesive.

The housing EDC may include a material having relatively high rigidity. For example, the housing EDC may include glass, plastic, or metal or may include a plurality of frames and/or plates that are composed of a combination thereof. The housing EDC may stably protect configurations of the display device DD accommodated in the inner space from an external impact. According to embodiments, a battery module for supplying power utilized for overall operations of the display device DD may be interposed between the display module DM and the housing EDC.

The display module DM may include a display panel DP and an anti-reflection layer CFL.

The display panel DP may be a configuration of components that substantially generates an image. The display panel DP may be a light emitting display panel. For example, the display panel DP may be an organic light emitting display panel, an inorganic light emitting display panel, an organic-inorganic light emitting display panel, a quantum dot display panel, a micro-LED display panel, or a nano-LED display panel. Hereinafter, it is described that the display panel DP is an organic light emitting display panel.

The display panel DP includes a base layer BL, a pixel layer PXL, and an encapsulation layer TFE. The display panel DP according to an embodiment of the present disclosure may be a flexible display panel. However, the present disclosure is not limited thereto. For example, the display panel DP may be a foldable display panel, which is folded with respect to a folding axis, or a rigid display panel.

The base layer BL may include a synthetic resin layer. The synthetic resin layer may be a polyimide-based resin layer. However, the material thereof is not particularly limited thereto. The base layer BL may include, for example, a glass substrate, a metal substrate, an organic/inorganic composite substrate, or the like.

The pixel layer PXL is disposed on the base layer BL. The pixel layer PXL may include a circuit layer DP_CL and an element layer DP_ED. The circuit layer DP_CL is interposed between the base layer BL and the element layer DP_ED.

The circuit layer DP_CL includes at least one insulating layer and a circuit element. Hereinafter, the insulating layer included in the circuit layer DP_CL is referred to as an "intermediate insulating layer". The intermediate insulating layer includes at least one intermediate inorganic film and at least one intermediate organic film. The circuit element may include a pixel driving circuit, which is included in each of a plurality of pixels for displaying an image, and a sensor driving circuit, which is included in each of a plurality of sensors for recognizing external information. The circuit layer DP_CL may further include signal lines connected to the pixel driving circuit and/or the sensor driving circuit.

According to an embodiment, each of the plurality of sensors may be a fingerprint recognition sensor, a proximity sensor, an iris recognition sensor, or the like. Furthermore, each of the plurality of sensors may be an optical sensor that recognizes the biometric information in an optical scheme. According to an embodiment of the present disclosure, an external input (e.g., a user's touch) as well as biometric information such as a fingerprint may be sensed by using the plurality of sensors. Accordingly, in an embodiment, the display device DD does not include a separate input sensing layer that senses an external input. In this case, the thickness of the display device DD may be further reduced. As a result, flexibility may be increased, and thus, the display device DD may be implemented in various types. For example, the display device DD may be implemented as a foldable, rollable, or slideable display device as described above.

The element layer DP_ED may include a light emitting element included in each of the pixels and a light sensing element included in each of the sensors. According to an embodiment, the light sensing element may be a photodiode. The light sensing element may be a sensor that detects or responds to light reflected by a user's fingerprint. The circuit layer DP_CL and the element layer DP_ED will be described in further detail with reference to FIG. 9.

The encapsulation layer TFE encapsulates the element layer DP_ED. The encapsulation layer TFE may include at least one organic film and at least one inorganic film. The inorganic film may include inorganic materials and may protect the element layer DP_ED from moisture/oxygen. The inorganic film may include, for example, a silicon nitride layer, a silicon oxynitride layer, a silicon oxide layer, a titanium oxide layer, an aluminum oxide layer, or the like, but is not limited particularly thereto. The organic film may include organic materials and may protect the element layer DP_ED from foreign objects such as dust particles.

The anti-reflection layer CFL may be disposed on the display panel DP. The anti-reflection layer CFL may reduce the reflectance of external light incident from outside of the display device DD. The anti-reflection layer CFL may be formed on the input display panel DP through sequential processes, but the present disclosure is not limited thereto. For example, the anti-reflection layer CFL may include color filters, a black matrix, and a planarization layer. The color filters may have a given arrangement. For example, the color filters may be arranged in consideration of emission colors of pixels included in the display panel DP. In an embodiment, the anti-reflection layer CFL may include a black matrix and a reflection adjustment layer. The reflection adjustment layer may selectively absorb light in a partial band among light reflected from inside of the display panel DP and/or an electronic device or incident light from outside of the display panel DP and/or the electronic device. In an embodiment, the anti-reflection layer CFL may be a polarizing film.

The display device DD according to an embodiment of the present disclosure may further include an adhesive layer AL. The window WM may be attached to the anti-reflection layer CFL by the adhesive layer AL. The adhesive layer AL may include, for example, an optical clear adhesive, an optically clear adhesive resin, or a pressure sensitive adhesive (PSA).

Figure 3:
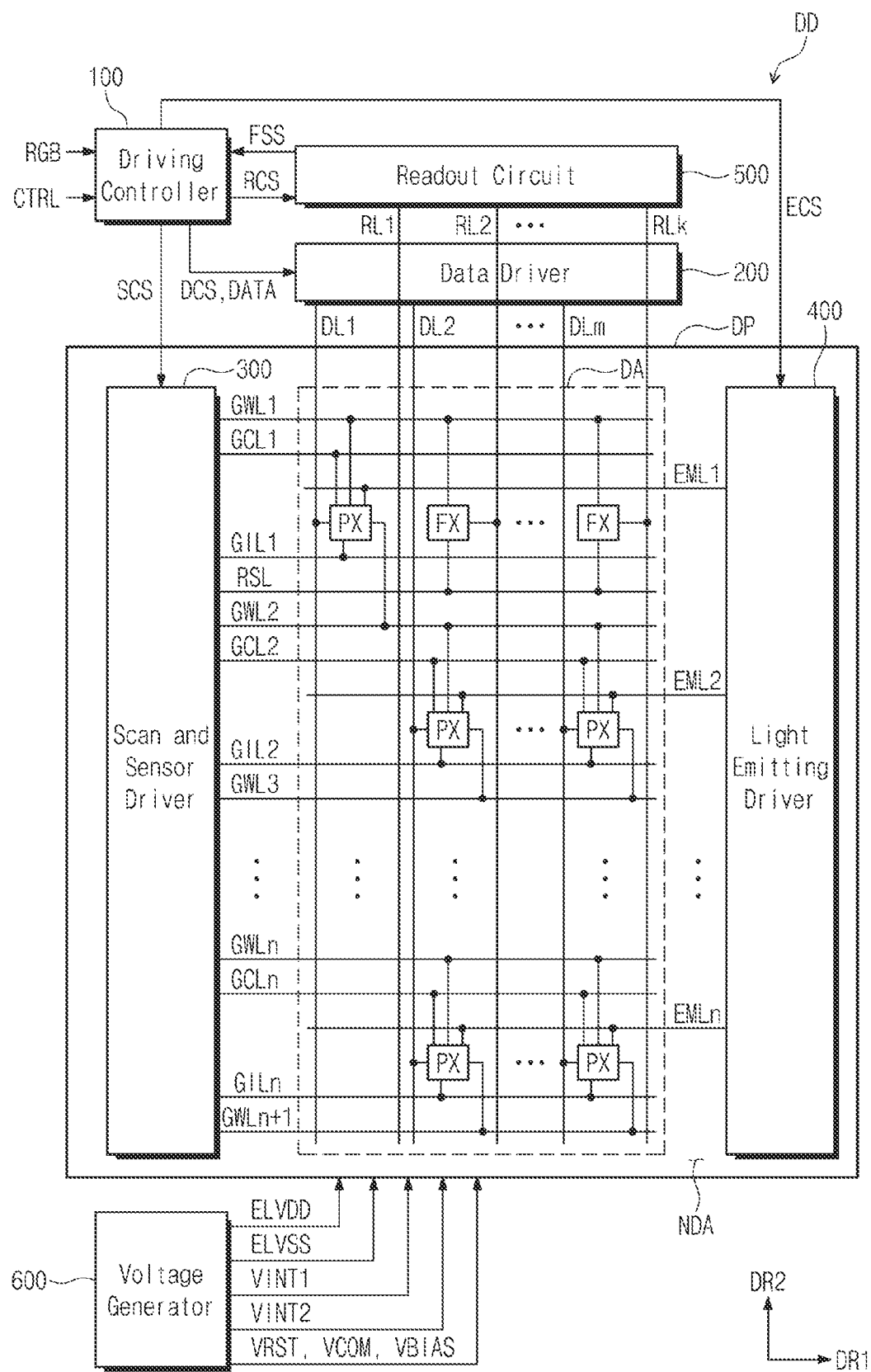
FIG. 3 is a block diagram of a display device, according to an embodiment of the present disclosure.

FIG. 3 is a block diagram of a display device, according to an embodiment of the present disclosure.

Referring to FIG. 3, the display device DD includes the display panel DP, a driving controller 100, a data driver 200, a scan and sensor driver 300, a light emitting driver 400, a readout circuit 500, and a voltage generator 600.

The driving controller 100 receives an input image signal RGB and a control signal CTRL. The driving controller 100 generates an output image signal DATA by converting a data format of the input image signal RGB so as to be suitable for the display panel DP and the data driver 200. The driving controller 100 outputs a scan control signal SCS, a data control signal DCS, an emission control signal ECS, and a readout control signal RCS.

The data driver 200 receives the data control signal DCS and the output image signal DATA from the driving controller 100. The data driver 200 converts the output image signal DATA into data signals and then outputs the data signals to a plurality of data lines DL1 to DLm, where m is a positive integer. The plurality of data lines DL1 to DLm are described in further detail below. The data signals refer to analog voltages corresponding to a grayscale level of the output image signal DATA.

The voltage generator 600 generates voltages utilized to operate the display panel DP. In an embodiment, the voltage generator 600 generates a first driving voltage ELVDD, a second driving voltage ELVSS, a first initialization voltage VINT1, a second initialization voltage VINT2, a reset voltage VRST, a sensor driving voltage VCOM, and a bias voltage VBIAS.

The display panel DP includes scan lines GIL1 to GILn, GCL1 to GCLn, and GWL1 to GWLn+1, a reset lines RSL, emission lines EML1 to EMLn, data lines DL1 to DLm, readout lines RL1 to RLk, pixels PX, and sensors FX, where each of n, m and k is a positive integer.

The display panel DP may include a display area DA corresponding to the transmission area TA (see FIG. 1) and a non-display area NDA corresponding to the bezel area BZA (shown in FIG. 1). The pixels PX and sensors FX may be disposed in the display area DA.

The scan and sensor driver 300 and the light emitting driver 400 may be positioned in the non-display area NDA of the display panel DP.

In an embodiment, the scan and sensor driver 300 is disposed adjacent to a first side of the display area DA in the display panel DP. The scan and sensor driver 300 receives the scan control signal SCS from the driving controller 100. The scan and sensor driver 300 may output scan signals as the scan lines GIL1 to GILn, GCL1 to GCLn, and GWL1 to GWLn+1 in response to the scan control signal SCS and may output a reset signal to the reset line RSL. The scan lines GIL1 to GILn, GCL1 to GCLn, and GWL1 to GWLn+1 and the reset line RSL extend from the scan and sensor driver 300 in the first direction DR1.

The light emitting driver 400 is disposed adjacent to a second side of the display area DA in the display panel DP. The light emitting driver 400 receives the emission control signal ECS from the driving controller 100. The light emitting driver 400 may output emission signals to the emission lines EML1 to EMLn in response to the emission control signal ECS. The emission lines EML1 to EMLn extend from the light emitting driver 400 in a direction opposite to the first direction DR1.

The scan lines GIL1 to GILn, GCL1 to GCLn, and GWL1 to GWLn, the reset lines RSL, and the emission lines EML1 to EMLn are spaced apart from one another in the second direction DR2. The data lines DL1 to DLm extend from the data driver 200 in a direction opposite to the second direction DR2, and are spaced apart from one another in the first direction DR1.

The plurality of pixels PX are electrically connected to the scan lines GIL1 to GILn, GCL1 to GCLn, and GWL1 to GWLn+1, the emission lines EML1 to EMLn, and the data lines DL1 to DLm. In an embodiment, each of the plurality of pixels PX may be electrically connected to four scan lines and one emission line. For example, as shown in FIG. 3, a first row of pixels may be connected to the scan lines GIL1, GCL1, GWL1, and GWL2 and the emission line EML1. Moreover, a second row of pixels may be connected to the scan lines GIL2, GCL2, GWL2, and GWL3 and the emission line EML2.

Each of the plurality of pixels PX includes a light emitting element ED (see FIG. 5) and a pixel driving circuit PDC (see FIG. 5) that control the emission of the light emitting element ED. The pixel driving circuit PDC may include one or more transistors and one or more capacitors. The scan and sensor driver 300 and the light emitting driver 400 may include transistors formed through the same process as the pixel driving circuit PDC.

Each of the plurality of pixels PX receives the first driving voltage ELVDD, the second driving voltage ELVSS, the first initialization voltage VINT1, and the second initialization voltage VINT2 from the voltage generator 600.

Figure 7:
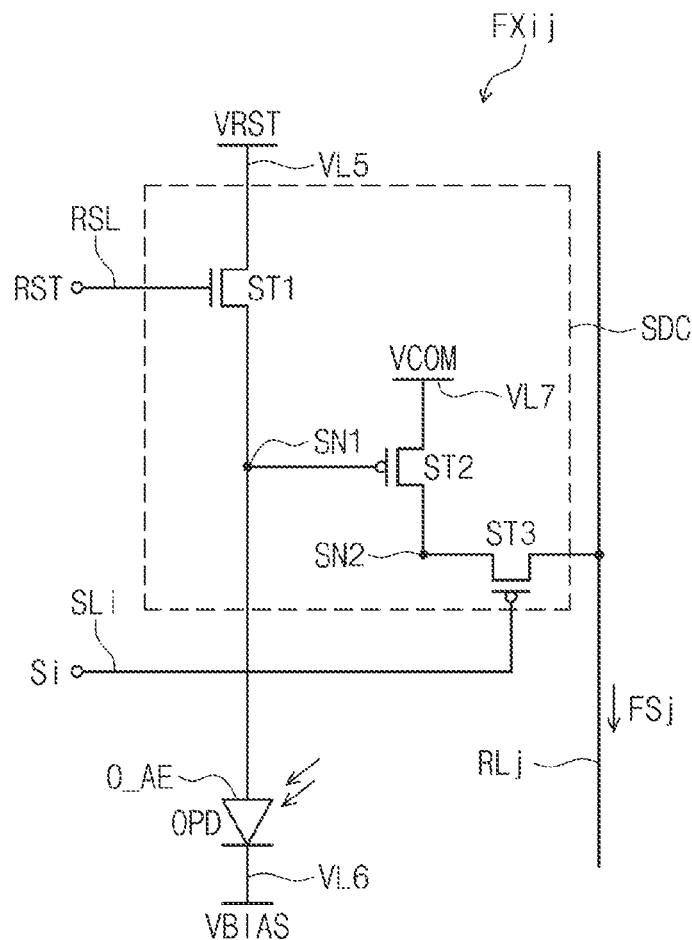
FIG. 7 is a circuit diagram of a sensor, according to an embodiment of the present disclosure.

Each of the sensors FX includes a light sensing element OPD (see FIG. 7) and a sensor driving circuit SDC (see FIG. 7). The sensor driving circuit SDC may include transistors formed through the same process as the pixel driving circuit PDC.

Each of the sensors FX may be connected to one corresponding scan line among the scan lines GWL1 to GWLn and one corresponding readout line among the readout lines RL1 to RLk. The sensors FX may be connected to the reset line RSL in common. In an embodiment, the number of sensors FX is less than the number of pixels PX. However, the present disclosure is not limited thereto. In an embodiment, the number of sensors FX disposed on the display panel DP may be greater than or equal to the number of pixels PX. In an embodiment, the number of readout lines RL1 to RLk is less than the number of data lines DL1 to DLm. That is, k<m. However, the present disclosure is not limited thereto. In an embodiment, the number of readout lines RL1 to RLk disposed on the display panel DP may be greater than or equal to the number of data lines DL1 to DLm.

The readout circuit 500 receives the readout control signal RCS from the driving controller 100. The readout circuit 500 may receive a sensing signal from the readout lines RL1 to RLk in response to the readout control signal RCS and then may provide a readout signal FSS to the driving controller 100.

In an embodiment, the sensors FX and the readout circuit 500 may operate in a blood pressure sensing mode (a first mode), a fingerprint sensing mode (a second mode), and a touch sensing mode (a third mode). In the blood pressure sensing mode, the readout signal FSS provided from the readout circuit 500 to the driving controller 100 may be a blood pressure sensing signal corresponding to the user's blood pressure. In a fingerprint detection mode, the readout signal FSS provided from the readout circuit 500 to the driving controller 100 may be a fingerprint sensing signal corresponding to a user's fingerprint. In a touch detection mode, the readout signal FSS provided from the readout circuit 500 to the driving controller 100 may be a signal indicating a user's touch location.

In the example shown in FIG. 3, the scan and sensor driver 300 and the sensor driver 300 are arranged to face the light emitting driver 400 with the pixels PX interposed therebetween, but the present disclosure is not limited thereto. For example, the scan and sensor driver 300 and the light emitting driver 400 may be arranged side by side to be adjacent to one of the first side surface and the second side surface of the display area DA in the display panel DP. In an embodiment, the scan and sensor driver 300 and the light emitting driver 400 may be integrated into one circuit.

Figure 4:
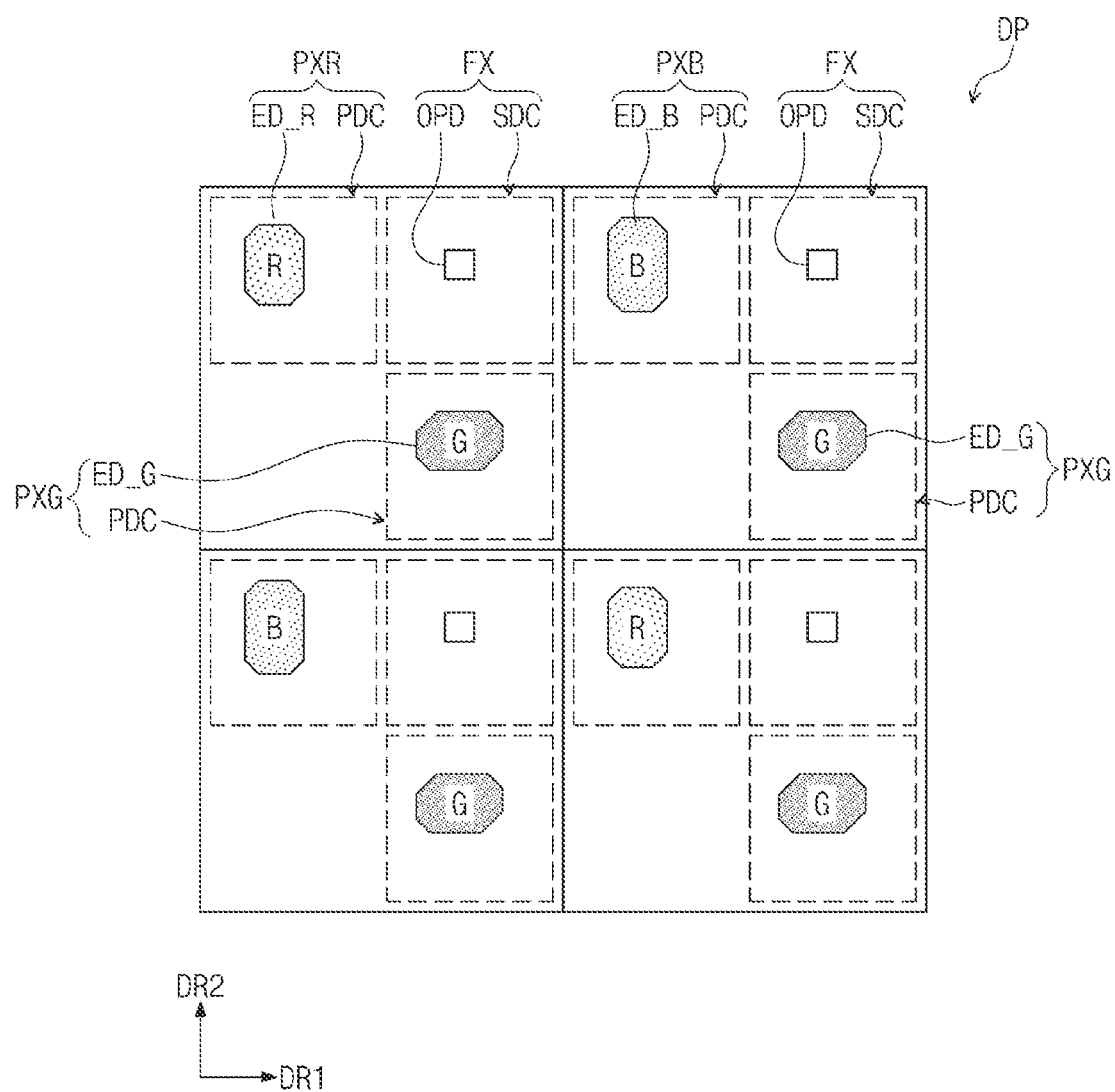
FIG. 4 is an enlarged plan view of a partial area of a display panel, according to embodiments of the present disclosure.

FIG. 4 is an enlarged plan view of a partial area of a display panel, according to embodiments of the present disclosure.

Referring to FIG. 4, pixels PXR, PXG, and PXB are arranged on the display panel DP. The pixel PXR includes a light emitting element ED_R and the pixel driving circuit PDC, the pixel PXG includes a light emitting element ED_G and the pixel driving circuit PDC, and the pixel PXB includes a light emitting element ED_B and the pixel driving circuit PDC. Each of the sensors FX includes the light sensing element OPD and the sensor driving circuit SDC.

Referring to FIG. 4, the pixels PXR and PXB and the sensors FX are disposed in odd-numbered rows, that is, a first row and a third row. In an embodiment, in the first row and third row, the pixels PXR and PXB and the sensors FX are alternately placed in the first direction DR1. Only the pixels PXG are positioned in the second row.

In an embodiment, the pixel PXR may include a light emitting element ED_R that emits light of a first color (e.g., red). The pixel PXG may include a light emitting element ED_G that emits light of a second color (e.g., green). The pixel PXB includes a light emitting element ED_B that emits light of a third color (e.g., blue).

As shown in FIG. 4, the pixels PXR and PXB may be alternately and repeatedly positioned in the second direction DR2 as well as the first direction DR1. Each of the second pixels PXG may be arranged between the two light sensing elements OPD in the second direction DR2.

The arrangement structure of the pixels PX and the sensors FX is not limited to that of FIG. 4 and may be variously changed according to embodiments.

In an embodiment, the light emitting element ED_R may have a larger size than the light emitting element ED_G. Furthermore, the light emitting element ED_B may have a size larger than or equal to the light emitting element ED_R. The size of each of the light emitting elements ED_R, ED_G, and ED_B is not limited thereto, and may be variously modified according to embodiments. For example, in an embodiment of the present disclosure, the light emitting elements ED_R, ED_G, and ED_B may have the same size as one another.

The shape of each of the light emitting elements ED_R, ED_G, and ED_B may be variously transformed into a polygon, a circle, an ellipse, and the like. In an embodiment, the shapes of the light emitting elements ED_R, ED_G, and ED_B may be different from one another. For example, the light emitting element ED_G may have a circular shape, and each of the light emitting elements ED_R and ED_B may have a quadrangle.

In an embodiment, an area size occupied by the sensor driving circuit SDC may be different from an area size occupied by the pixel driving circuit PDC.

Figure 5:
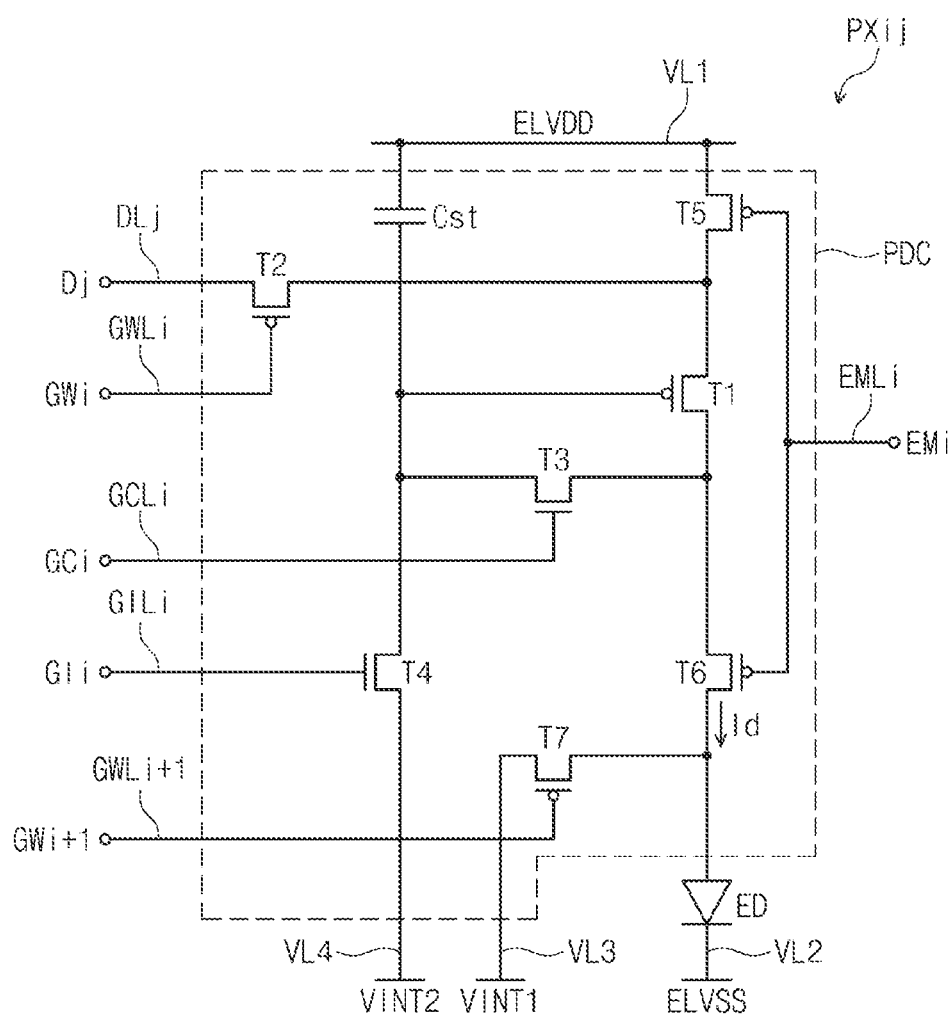
FIG. 5 is a circuit diagram of a pixel, according to an embodiment of the present disclosure.

FIG. 5 is a circuit diagram of a pixel, according to an embodiment of the present disclosure.

FIG. 5 illustrates one pixel PXij among the pixels PX illustrated in FIG. 3, where each of i and j is a positive integer. Each of the plurality of pixels PX shown in FIG. 3 may have the same circuit configuration as the pixel PXij shown in FIG. 5.

Referring to FIG. 5, the pixel PXij includes the pixel driving circuit PDC and the at least one light emitting element ED. The light emitting element ED may be a light emitting diode. According to an embodiment, the light emitting element ED may be an organic light emitting diode including an organic light emitting layer. The pixel driving circuit PDC according to an embodiment includes first to seventh transistors T1, T2, T3, T4, T5, T6, and T7 and one capacitor Cst.

The third and fourth transistors T3 and T4 of the first to seventh transistors T1 to T7 may be N-type transistors that use an oxide semiconductor as a semiconductor layer. Each of the first, second, fifth, sixth, and seventh transistors T1, T2, T5, T6, and T7 may be P-type transistors that have a low-temperature polycrystalline silicon (LTPS) semiconductor layer. However, the present disclosure is not limited thereto. In an embodiment, all of the first to seventh transistors T1 to T7 may be P-type transistors. In an embodiment, all of the first to seventh transistors T1 to T7 may be N-type transistors. In an embodiment, at least one of the first to seventh transistors T1 to T7 may be an N-type transistor and the others thereof may be P-type transistors. A configuration of the pixel driving circuit PDC according to an embodiment of the present disclosure is not limited to an embodiment illustrated in FIG. 5. The pixel driving circuit PDC illustrated in FIG. 5 is only an example. For example, the configuration of the pixel driving circuit PDC may be modified and variously implemented according to embodiments.

The pixel PXij is electrically connected to the scan lines GILi, GCLi, GWLi, and GWLi+1, the emission line EMLi, and the data line DLj. The scan lines GILi, GCLi, GWLi, and GWLi+1 may deliver scan signals GIi, GCi, GWi, and GWi+1, respectively. The emission line EMLi may deliver an emission signal EMi. The data line DLj delivers a data signal Dj. The data signal Dj may have a voltage level corresponding to the input image signal RGB that is input to the display device DD (see FIG. 3). First to fourth driving voltage lines VL1, VL2, VL3, and VL4 may transfer a first driving voltage ELVDD, a second driving voltage ELVSS, a first initialization voltage VINT1, and a second initialization voltage VINT2, respectively.

The first transistor T1 includes a first electrode connected to the first driving voltage line VL1 through the fifth transistor T5, a second electrode electrically connected to an anode of the light emitting element ED through the sixth transistor T6, and a gate electrode connected to one end of the capacitor Cst. The first transistor T1 may receive the data signal Dj delivered through the data line DLj depending on the switching operation of the second transistor T2 and then may supply a driving current Id to the light emitting element ED.

The second transistor T2 includes a first electrode connected to the data line DLj, a second electrode connected to the first electrode of the first transistor T1, and a gate electrode connected to the scan line GWLi. The second transistor T2 may be turned on in response to the scan signal GWi transferred through the scan line GWLi and may transfer the data signal Dj transferred through the data line DLj to the first electrode of the first transistor T1.

The third transistor T3 includes a first electrode connected to the gate electrode of the first transistor T1, a second electrode connected to the second electrode of the first transistor T1, and a gate electrode connected to the scan line GCLi. The third transistor T3 may be turned on in response to the scan signal GCi transferred through the scan line GCLi, and thus, the gate electrode and the second electrode of the first transistor T1 may be connected, that is, the first transistor T1 may be diode-connected.

The fourth transistor T4 includes a first electrode connected to the gate electrode of the first transistor T1, a second electrode connected to the fourth driving voltage line VL4 through which the second initialization voltage VINT2 is transferred, and a gate electrode connected to the scan line GILi. The fourth transistor T4 may be turned on in response to the scan signal GIi transferred through the scan line GILi such that the second initialization voltage VINT2 is transferred to the gate electrode of the first transistor T1. As such, a voltage of the gate electrode of the first transistor T1 may be initialized. This operation may be referred to as an "an initialization operation".

The fifth transistor T5 includes a first electrode connected to the first driving voltage line VL1, a second electrode connected to the first electrode of the first transistor T1, and a gate electrode connected to the emission line EMLi.

The sixth transistor T6 includes a first electrode connected to the second electrode of the first transistor T1, a second electrode connected to an anode of the light emitting element ED, and a gate electrode connected to the emission line EMLi.

The fifth transistor T5 and the sixth transistor T6 may be simultaneously turned on in response to the emission control signal EMi transferred through the emission line EMLi. As such, the first driving voltage ELVDD may be compensated through the diode-connected transistor T1 so as to be supplied to the light emitting element ED.

The seventh transistor T7 includes a first electrode connected to the anode of the light emitting element ED, a second electrode connected to the third driving voltage line VL3, and a gate electrode connected to the scan line GWLi+1. The seventh transistor T7 is turned on in response to the scan signal GWi+1 received through the scan line GWLi+1 to electrically connect the anode of the light emitting element ED and the third driving voltage line VL3.

One end of the capacitor Cst is connected to the gate electrode of the first transistor T1, and the other end of the capacitor Cst is connected to the first driving voltage line VL1. A cathode of the light emitting element ED may be connected to the second driving voltage line VL2 that transfers the second driving voltage ELVSS. The structure of the pixel PXij according to an embodiment is not limited to the structure illustrated in FIG. 5. For example, the number of transistors included in the one pixel PXij, the number of capacitors included in the pixel PXij, and the connection relationship between the transistors and the capacitors may be variously modified according to embodiments.

Figure 6:
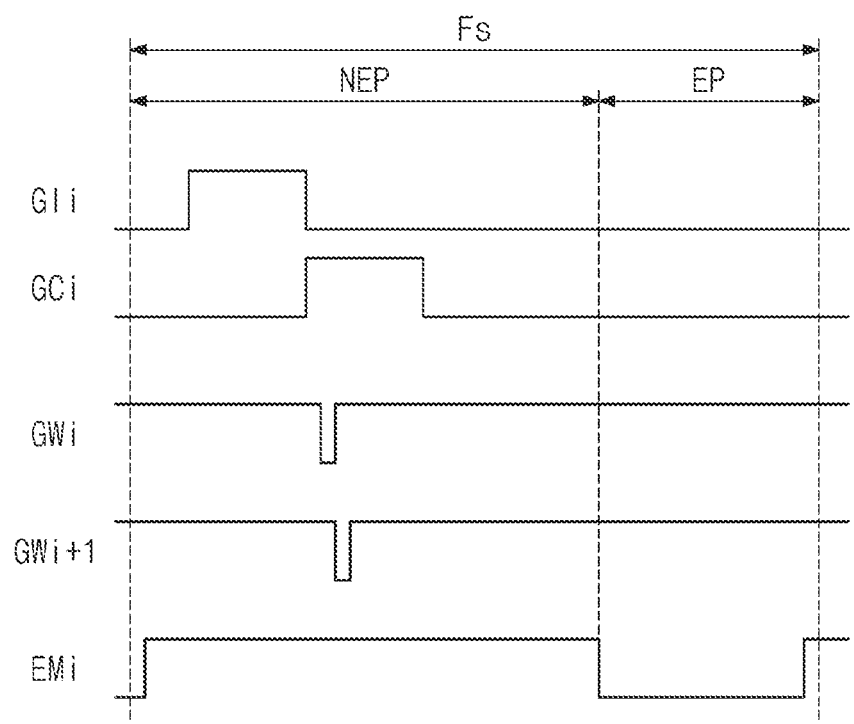
FIG. 6 is a timing diagram for describing an operation of a pixel illustrated in FIG. 5.

FIG. 6 is a timing diagram for describing an operation of a pixel illustrated in FIG. 5.

Referring to FIGS. 5 and 6, one frame Fs may include an emission period EP and a non-emission period NEP. The emission period EP may correspond to a low-level period (e.g., an active period) of the emission control signal EMi. The non-emission period NEP may correspond to a high-level period (e.g., an inactive period) of the emission control signal EMi.

The non-emission period NEP may include an initialization period and a data programming and compensation period.

When the scan signal GIi having a high level is provided through the scan line GILi during the initialization period, the fourth transistor T4 is turned on. The second initialization voltage VINT2 is delivered to the gate electrode of the first transistor T1 through the fourth transistor T4 so as to initialize the first transistor T1.

Next, when the scan signal GCi having a high level is supplied through the scan line GCLi during the data programming and compensation period, the third transistor T3 is turned on. The first transistor T1 is diode-connected by the third transistor T3 thus turned on to be forward-biased. At this time, when the scan signal GWi having a low level is supplied through the scan line GWLi, the second transistor T2 is turned on. In the case, a compensation voltage, which is obtained by reducing the voltage of the data signal Dj supplied from the data line DLj by a threshold voltage of the first transistor T1, is applied to the gate electrode of the first transistor T1. That is, a gate voltage applied to the gate electrode of the first transistor T1 may be a compensation voltage.

As the first driving voltage ELVDD and the compensation voltage are respectively applied to opposite ends of the capacitor Cst, charges corresponding to a difference between the first driving voltage ELVDD and the compensation voltage may be stored in the capacitor Cst.

The seventh transistor T7 is turned on in response to the scan signal GWi+1 having a low level that is delivered through the scan line GWLi+1. As the seventh transistor T7 is turned on, the anode of the light emitting element ED is electrically connected to the third driving voltage line VL3. Accordingly, the anode of the light emitting element ED may be initialized to the first initialization voltage VINT1.

Next, during the emission period EP, the emission control signal EMi supplied from the emission line EMLi is changed from a high level to a low level. During the emission period EP, the fifth transistor T5 and the sixth transistor T6 are turned on by the emission control signal EMi having a low level. In this case, the driving current Id according to a voltage difference between the gate voltage of the gate electrode of the first transistor T1 and the first driving voltage ELVDD is generated and supplied to the light emitting element ED through the sixth transistor T6, and the driving current Id flows through the light emitting element ED. The light emitting element ED may emit light with luminance corresponding to the driving current Id.

FIG. 7 is a circuit diagram of a sensor, according to an embodiment of the present disclosure.

FIG. 7 shows one sensor FXij among the plurality of sensors FX shown in FIG. 3, in which each of i and j is a positive integer. Each of the plurality of sensors FX shown in FIG. 3 may have the same circuit configuration as the sensor FXij shown in FIG. 7.

The sensor FXij is electrically connected to a sensor scan line SLj, a reset line RSL, and a readout line RLj.

The sensor FXij includes the light sensing element OPD and the sensor driving circuit SDC. The light sensing element OPD may be a photodiode. According to an embodiment, the light sensing element OPD may be an organic photodiode including an organic material as a photoelectric conversion layer. A light sensing anode O_AE of the light sensing element OPD may be connected to a first sensing node SN1, and a cathode thereof may be connected to a sixth driving voltage line VL6 transferring the bias voltage VBIAS. In an embodiment, the bias voltage VBIAS may be the same voltage as the second driving voltage ELVSS provided to the cathode of the light emitting element ED shown in FIG. 5.

The sensor driving circuit SDC includes three transistors ST1 to ST3. The three transistors ST1 to ST3 may include the reset transistor ST1, the amplification transistor ST2, and the output transistor ST3. Some of the reset transistor ST1, the amplification transistor ST2, and the output transistor ST3 may be P-type transistors, and the other(s) thereof may be an N-type transistor. In an embodiment, the reset transistor ST1 may be the same N-type transistor as the third transistor T3 of the pixel PXij shown in FIG. 5, and each of the amplification transistor ST2 and the output transistor ST3 may be the same P-type transistor as the first and second transistors T1 and T2 of the pixel PXij shown in FIG. 5. However, the present disclosure is not limited thereto. In an embodiment, all of the reset transistor ST1, the amplification transistor ST2, and the output transistor ST3 may be P-type transistors. In an embodiment, all of the reset transistor ST1, the amplification transistor ST2, and the output transistor ST3 may be N-type transistors.

The reset transistor ST1 includes a first electrode connected to a reset voltage line VL5 that receives a reset voltage VRST, a second electrode connected to the first sensing node SN1, and a gate electrode connected to a reset line RSL that receives the reset signal RST. The reset transistor ST1 may reset a potential of the first sensing node SN1 to the reset voltage VRST in response to the reset signal RST. In an embodiment, the reset voltage VRST may have a voltage level lower than the bias voltage VBIAS.

The amplification transistor ST2 includes a first electrode connected to a seventh driving voltage line VL7 receiving the sensor driving voltage VCOM, a second electrode connected to a second sensing node SN2, and a gate electrode connected to the first sensing node SN1. In an embodiment, the sensor driving voltage VCOM may have the same voltage level as one of the first driving voltage ELVDD, the first initialization voltage VINT1, or the second initialization voltage that are provided by the pixel PXij shown in FIG. 5. The amplification transistor ST2 may provide a current corresponding to a potential of the first sensing node SN1 to the second sensing node SN2.

The output transistor ST3 includes a first electrode connected to the second sensing node SN2, a second electrode connected to the readout line RLj, and a gate electrode connected to the sensor scan line SLi receiving the sensor scan signal Si. The output transistor ST3 may output a sensing signal FSj to the readout line RLj in response to the sensor scan signal Si.

The circuit configuration of the sensor driving circuit SDC according to an embodiment of the present disclosure is not limited to that illustrated in FIG. 7. The sensor driving circuit SDC illustrated in FIG. 7 is only an example, and the configuration of the sensor driving circuit SDC may be modified and variously implemented according to embodiments.

Figure 8:
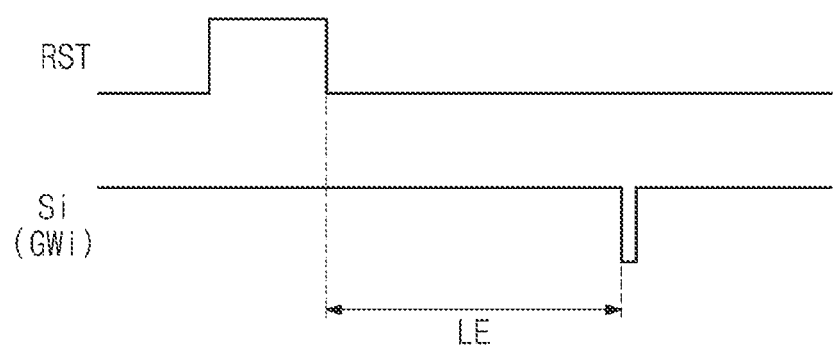
FIG. 8 is a timing diagram for describing an operation of the sensor shown in FIG. 7.

FIG. 8 is a timing diagram for describing an operation of the sensor FXij shown in FIG. 7.

Referring to FIGS. 7 and 8, when the reset signal RST transitions to a high level, the reset transistor ST1 turns on. As the reset transistor ST1 is turned on, the first sensing node SN1 may be initialized to the reset voltage VRST.

After the reset signal RST transitions to a low level, the sensor FXij is exposed to light during a light exposure period LE. When a user's hand touches a display surface, the light sensing element OPD may generate photocharges corresponding to light reflected by the user's hand, and the generated photocharges may be accumulated in the first sensing node SN1.

The amplification transistor ST2 may be a source follower amplifier that generates a source-drain current in proportion to a charge amount of the first sensing node SN1 input to the gate electrode of the amplification transistor ST2.

While the sensor scan signal Si is at an inactive level (e.g., a high level), the output transistor ST3 is turned off. When the sensor scan signal Si transitions to an active level (e.g., a low level), the output transistor ST3 is turned on. When the output transistor ST3 is turned on, the sensing signal FSj corresponding to a current flowing through the amplification transistor ST2 may be output to the readout line RLj.

In an embodiment, the sensor scan signal Si may be the same signal as the scan signal GWi shown in FIGS. 5 and 6. That is, the pixels PXij and the sensors FXij arranged in the i-th row may receive the same scan signal GWi.

In an embodiment, during a fingerprint sensing mode, the light sensing element OPD may generate photocharges corresponding to light reflected by a ridge of a fingerprint or a valley between ridges of the fingerprint. During a fingerprint sensing mode, the sensing signal FSj output from the sensor FXij may be a signal corresponding to the user's fingerprint.

In an embodiment, during a blood pressure measurement mode, the light sensing element OPD may generate photocharges corresponding to light reflected from blood vessels located under a dermal layer of the user's skin. During cardiac systole, blood moves to the periphery, increasing arterial blood volume. On the other hand, during cardiac diastole, blood volume decreases. This change in blood volume changes the reflected light. During a blood pressure measurement mode, the sensing signal FSj output from the sensor FXij may be a signal corresponding to the user's blood pressure.

In an embodiment, during a touch sensing mode, the light sensing element OPD may generate photocharges corresponding to light reflected by the user's touch. The sensing signal FSj output from the sensor FXij during the touch sensing mode may be a signal indicating whether a user performs a touch operation.

Figure 9:
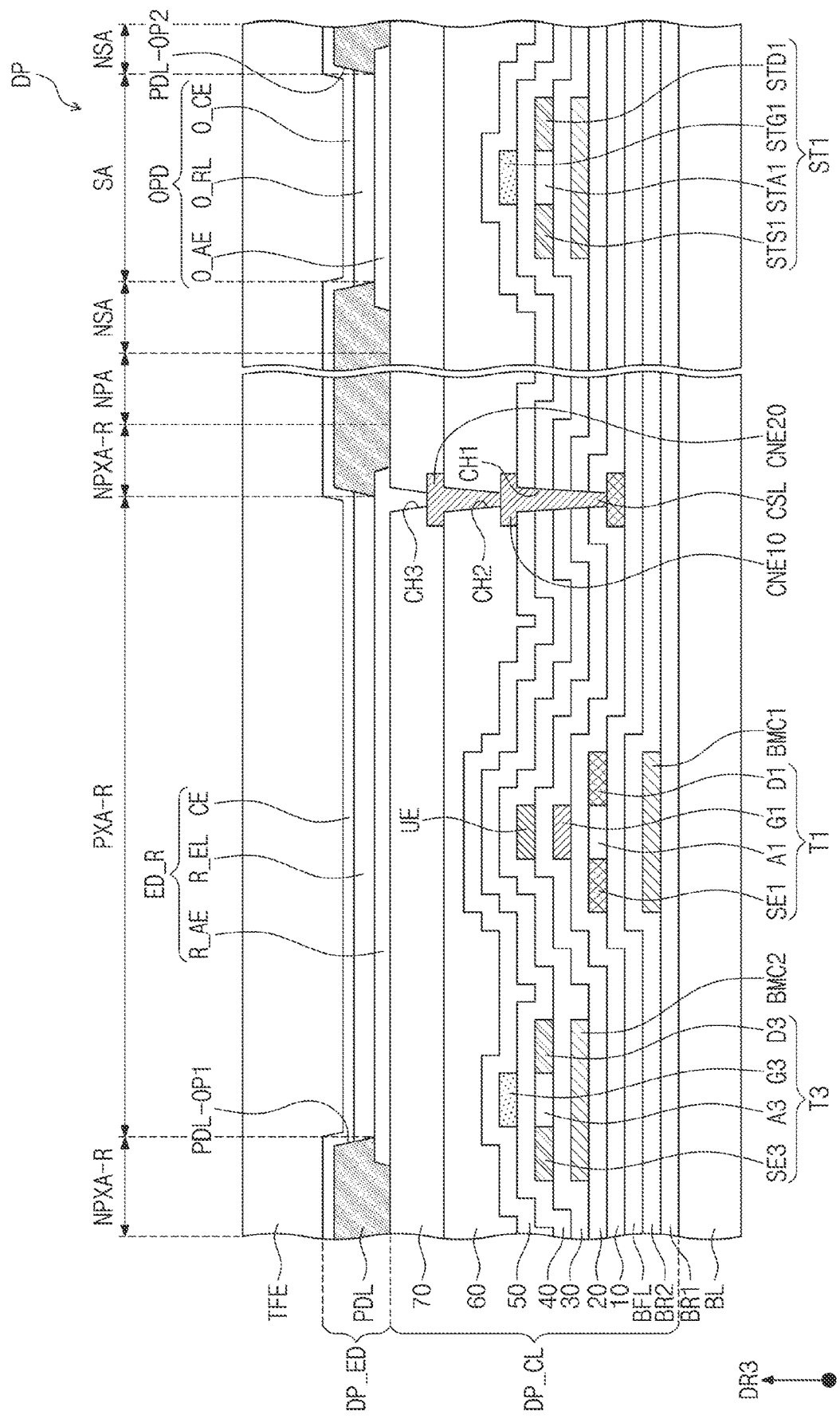
FIG. 9 is a cross-sectional view of a display panel, according to an embodiment of the present disclosure.

FIG. 9 is a cross-sectional view of the display panel DP, according to an embodiment of the present disclosure. FIG. 9 shows portions of first and third transistors T1 and T3 shown in FIG. 5 and the reset transistor ST1 shown in FIG. 7.

Referring to FIG. 9, the display panel DP may include a base layer BL, a circuit layer DP_CL disposed on the base layer BL, an element layer DP_ED, and an encapsulation layer TFE.

The base layer BL may include a synthetic resin layer. The synthetic resin layer may include a thermosetting resin. For example, the synthetic resin layer may be a polyimide-based resin layer. However, the material thereof is not particularly limited thereto. The synthetic resin layer may include at least one of, for example, acrylate-based resin, methacrylate-based resin, polyisoprene, vinyl-based resin, epoxy-based resin, urethane-based resin, cellulose-based resin, siloxane-based resin, polyamide-based resin, and perylene-based resin. The base layer may include, for example, a glass substrate, a metal substrate, an organic/inorganic composite substrate, or the like.

At least one inorganic layer is formed on an upper surface of the base layer BL. The inorganic layer may include at least one of, for example, aluminum oxide, titanium oxide, silicon oxide, silicon oxynitride, zirconium oxide, and hafnium oxide. The inorganic layer may be formed of multiple layers. The multi-layered inorganic layers may constitute barrier layers BR1 and BR2 and/or a buffer layer BFL, which will be described below. The barrier layers BR1 and BR2 and the buffer layer BFL may be disposed selectively.

The barrier layers BR1 and BR2 prevent foreign objects from being introduced from outside of the display device DD. The barrier layers BR1 and BR2 may include, for example, a silicon oxide layer and a silicon nitride layer. Each of the silicon oxide layer and the silicon nitride layer may include a plurality of layers, and the silicon oxide layers and the silicon nitride layers may be alternately stacked.

The barrier layers BR1 and BR2 may include the first barrier layer BR1 and the second barrier layer BR2. A first back metal layer BMC1 may be interposed between the first barrier layer BR1 and the second barrier layer BR2. In an embodiment of the present disclosure, the first back metal layer BMC1 may be omitted.

The buffer layer BFL may be disposed on the barrier layers BR1 and BR2. The buffer layer BFL may increase a bonding force between the base layer BL and a semiconductor pattern and/or a conductive pattern. The buffer layer BFL may include a silicon oxide layer and a silicon nitride layer. The silicon oxide layer and the silicon nitride layer may be alternately stacked.

A first semiconductor pattern may be disposed on the buffer layer BFL. The first semiconductor pattern may include a silicon semiconductor. For example, the silicon semiconductor may include amorphous silicon or polycrystalline silicon. For example, the first semiconductor pattern may include low-temperature polysilicon.

FIG. 9 illustrates only a portion of the first semiconductor pattern disposed on the buffer layer BFL. Another portion of the first semiconductor pattern may be further disposed in another area. The first semiconductor pattern may be arranged across pixels in a specific rule. The first semiconductor pattern may have different electrical characteristics depending on whether the first semiconductor pattern is doped. The first semiconductor pattern may include a first area having high conductivity and a second area having low conductivity. The first area may be doped with an N-type dopant or a P-type dopant. A P-type transistor may include an area doped with the P-type dopant, and an N-type transistor may include an area doped with the N-type dopant. The second area may be an undoped area or an area doped with a concentration lower than a concentration in the first area.

The conductivity of the first area is greater than the conductivity of the second area. The first area may substantially serve as an electrode or a signal line. The second area may substantially correspond to an active area (or a channel) of a transistor. In other words, a part of the semiconductor pattern may be an active area of the transistor, another part thereof may be a source or drain of the transistor, and another part thereof may be a connection electrode or a connection signal line.

A first electrode SE1, a channel part A1, and a second electrode D1 of the first transistor T1 are formed from the first semiconductor pattern. The first electrode SE1 and the second electrode D1 of the first transistor T1 extend in opposite directions from the channel part A1.

A portion of a connection signal line CSL formed from the first semiconductor pattern is illustrated in FIG. 9. According to embodiments, the connection signal line CSL may be electrically connected to the second electrode of the sixth transistor T6 (see FIG. 5) on a plane.

A first insulating layer 10 may be disposed on the buffer layer BFL. The first insulating layer 10 may overlap a plurality of pixels in common and may cover the first semiconductor pattern. The first insulating layer 10 may be an inorganic layer and/or an organic layer, and may have a single layer or multi-layer structure. The first insulating layer 10 may include at least one of, for example, aluminum oxide, titanium oxide, silicon oxide, silicon nitride, silicon oxynitride, zirconium oxide, and hafnium oxide. In an embodiment, the first insulating layer 10 may be a single silicon oxide layer. An insulating layer of the circuit layer DP_CL, which is to be described below, as well as the first insulating layer 10, may be an inorganic layer and/or an organic layer, and may have a single layer structure or a multi-layer structure. The inorganic layer may include at least one of the above-described materials, but is not limited thereto.

A third electrode G1 of the first transistor T1 is disposed on the first insulating layer 10. The third electrode G1 may be a portion of a metal pattern. The third electrode G1 of the first transistor T1 overlaps the channel part A1 of the first transistor T1. In a process of doping the first semiconductor pattern, the third electrode G1 of the first transistor T1 may function as a mask. The third electrode G1 may include, for example, titanium (Ti), silver (Ag), an alloy containing silver (Ag), molybdenum (Mo), an alloy containing molybdenum (Mo), aluminum (Al), an alloy containing aluminum (Al), an aluminum nitride (AlN), tungsten (W), a tungsten nitride (WN), copper (Cu), indium tin oxide (ITO), indium zinc oxide (IZO), or the like.

A second insulating layer 20 may be disposed on the first insulating layer 10 and may cover the third electrode G1 of the first transistor T1. The second insulating layer 20 may be an inorganic layer and/or an organic layer, and may have a single layer structure or a multi-layer structure. The second insulating layer 20 may include at least one of, for example, silicon oxide, silicon nitride, and silicon oxynitride. In an embodiment, the second insulating layer 20 may have a multi-layer structure including a silicon oxide layer and a silicon nitride layer.

An upper electrode UE and a second back metal layer BMC2 may be disposed on the second insulating layer 20. The upper electrode UE may overlap the third electrode G1. The upper electrode UE may be a portion of a metal pattern. A portion of the third electrode G1 and the upper electrode UE overlapping the portion of the third electrode G1 may define the capacitor Cst (see FIG. 5). In an embodiment of the present disclosure, the second insulating layer 20 may be replaced with an insulating pattern. In this case, the upper electrode UE may be disposed on an insulating pattern, and the upper electrode UE may serve as a mask for forming an insulating pattern from the second insulating layer 20.

The second back metal layer BMC2 may be disposed to correspond to a lower portion of an oxide thin film transistor (e.g., the third transistor T3). The second back metal layer BMC2 may receive a constant voltage or a signal.

A third insulating layer 30 may be disposed on the second insulating layer 20 and may cover the upper electrode UE and the second back metal layer BMC2. The third insulating layer 30 may have a single layer or multi-layer structure. For example, the third insulating layer 30 may have a multi-layer structure including a silicon oxide layer and a silicon nitride layer.

A second semiconductor pattern may be disposed on the third insulating layer 30. The second semiconductor pattern may include an oxide semiconductor. The oxide semiconductor may include a plurality of areas that are distinguished from one another depending on whether metal oxide is reduced. An area (hereinafter referred to as a "reduction area") in which the metal oxide is reduced has higher conductivity than an area (hereinafter referred to as a "non-reduction area") in which the metal oxide is not reduced. The reduction area substantially serves as a source/drain area of a transistor or a signal line. The non-reduction area substantially corresponds to an active area (alternatively, a semiconductor area or a channel) of the transistor. In other words, a part of the second semiconductor pattern may be the active area of the transistor, another part thereof may be the source/drain area of the transistor, and another part thereof may be a signal transmission area.

A first electrode SE3, a channel part A3, and a second electrode D3 of the third transistor T3 are formed from the second semiconductor pattern. The first electrode SE3 and the second electrode D3 include a metal reduced from a metal oxide semiconductor. The first electrode SE3 and the second electrode D3 may extend in directions opposite to each other from the channel part A3 on a cross section.

A fourth insulating layer 40 may be disposed on the third insulating layer 30. The fourth insulating layer 40 may overlap a plurality of pixels in common and may cover the second semiconductor pattern. The fourth insulating layer 40 may include at least one of, for example, aluminum oxide, titanium oxide, silicon oxide, silicon nitride, silicon oxynitride, zirconium oxide, and hafnium oxide.

A third electrode G3 of the third transistor T3 is disposed on the fourth insulating layer 40. The third electrode G3 may be a portion of a metal pattern. The third electrode G3 of the third transistor T3 overlaps the channel part A3 of the third transistor T3. The third electrode G3 may function as a mask in a process of doping the second semiconductor pattern. In an embodiment of the present disclosure, the fourth insulating layer 40 may be replaced with an insulating pattern.

A fifth insulating layer 50 may be disposed on the fourth insulating layer 40 and may cover the third electrode G3. The fifth insulating layer 50 may be an inorganic layer.

A first connection electrode CNE10 may be disposed on the fifth insulating layer 50. The first connection electrode CNE10 may be connected to the connection signal line CSL through a first contact hole CH1 penetrating the first to fifth insulating layers 10, 20, 30, 40, and 50.

The sixth insulating layer 60 may be disposed on the fifth insulating layer 50. The sixth insulating layer 60 may be an organic layer. The organic layer may include general purpose polymers such as, for example, benzocyclobutene (BCB), polyimide, hexamethyldisiloxane (HMDSO), polymethylmethacrylate (PMMA) or polystyrene (PS), a polymer derivative having a phenolic group, an acrylic polymer, an imide-based polymer, an aryl ether-based polymer, an amide-based polymer, a fluorine-based polymer, a p-xylene-based polymer, a vinyl alcohol-based polymer, and the blend thereof, but is not particularly limited thereto.

A second connection electrode CNE20 may be disposed on the fifth insulating layer 60. The second connection electrode CNE20 may be connected to the first connection electrode CNE10 through a second contact hole CH2 penetrating the sixth insulating layer 60. The seventh insulating layer 70 may be disposed on the sixth insulating layer 60 and may cover the second connection electrode CNE20. The seventh insulating layer 70 may be an organic layer.

A first electrode layer is disposed on the circuit layer DP_CL. A pixel defining layer PDL is formed on the first electrode layer. The first electrode layer may include a first anode R_AE and the light sensing anode O_AE. In an embodiment, the first anode R_AE and the light sensing anode O_AE are disposed on the seventh insulating layer 70. The first anode R_AE may be connected to the second connection electrode CNE20 through a third contact hole CH3 penetrating the seventh insulating layer 70. FIG. 9 shows only the first anode R_AE corresponding to red light. However, the first electrode layer may further include a second anode G_AE (see FIG. 10) corresponding to green light and a third anode B_AE (see FIG. 10) corresponding to blue light.

First and second film openings PDL-OP1 and PDL-OP2 are provided on the pixel defining layer PDL. The first film opening PDL-OP1 exposes at least part of the first anode R_AE. The second film opening PDL-OP2 exposes at least part of the light sensing anode O_AE.

In an embodiment of the present disclosure, the pixel defining layer PDL may further include a black material. The pixel defining layer PDL may further include a black organic dye/pigment such as, for example, carbon black, aniline black, or the like. The pixel defining layer PDL may be formed by mixing a blue organic material and a black organic material. The pixel defining layer PDL may further include a liquid-repellent organic material.

As shown in FIG. 9, the display panel DP may include an emission area PXA-R and a non-emission area NPXA-R adjacent to the emission area PXA-R. The non-emission area NPXA-R may surround the emission area PXA-R. In an embodiment, the emission area PXA-R is defined to correspond to a partial area of the first anode R_AE exposed by the first film opening PDL-OP1.

A light emitting layer may be disposed on the first electrode layer. The light emitting layer may include red, green and blue light emitting layers. The red, green, and blue light emitting layers may be disposed in areas corresponding to the first film openings PDL-OP1. The red, green, and blue light emitting layers may be separately formed in red, green, and blue pixels PXR, PXG, and PXB illustrated in FIG. 4, respectively. Each of the red, green, and blue light emitting layers may include an organic material and/or an inorganic material. The red, green and blue light emitting layers may generate a predetermined colored light. For example, the light emitting layer R_EL may generate red light. FIG. 9 shows that the light emitting layer R_EL is disposed in an area corresponding to the first film opening PDL-OP1.

In an embodiment, patterned red, green, and blue light emitting layers are described. However, one light emitting layer may be commonly disposed in a plurality of emission areas according to embodiments. The one light emitting layer may generate white light or blue light, and may have a multi-layer structure referred to as "tandem".

The light emitting layer R_EL may include a low-molecular organic material or a high-molecular organic material as a light emitting material. A cathode CE is disposed on the light emitting layer R_EL. According to an embodiment, the cathode CE may be commonly disposed in the emission area PXA-R, the non-emission area NPXA-R, and a non-pixel area NPA.

The circuit layer DP_CL may further include the sensor driving circuit SDC (see FIG. 7). For convenience of description, the reset transistor ST1 of the sensor driving circuit SDC is shown. A first electrode STS1, a channel part STA1, and a second electrode STD1 of the reset transistor ST1 are formed from the second semiconductor pattern. The first electrode STS1 and the second electrode STD1 include a metal reduced from a metal oxide semiconductor. The fourth insulating layer 40 covers the first electrode STS1, the channel part STA1, and the second electrode STD1 of the reset transistor ST1. A third electrode STG1 of the reset transistor ST1 is disposed on the fourth insulating layer 40. In an embodiment, the third electrode STG1 may be a part of the metal pattern. The third electrode STG1 of the reset transistor ST1 overlaps the channel part STA1 of the reset transistor ST1.

In an embodiment of the present disclosure, the reset transistor ST1 may be disposed on the same layer as the third transistor T3. That is, the first electrode STS1, the channel part STA1, and the second electrode STD1 of the reset transistor ST1 may be formed through a process the same as the first electrode SE3, the channel part A3, and the second electrode D3 of the third transistor T3. The third electrode STG1 of the reset transistor ST1 may be simultaneously formed through the same process as the third electrode G3 of the third transistor T3. According to embodiments, the first electrode and the second electrode of each of the amplification transistor ST2 and the output transistor ST3 of the sensor driving circuit SDC may be formed through the same process as the first electrode SE1 and the second electrode D1 of the first transistor T1. The reset transistor ST1 and the third transistor T3 may be formed on the same layer through the same process. Accordingly, because an additional process of forming the reset transistor ST1 is not performed, process efficiency and costs may be reduced.

The element layer DP_ED may further include the light sensing element OPD (see FIG. 7). FIG. 9 shows only the light sensing element OPD.

The light sensing element OPD may include the light sensing anode O_AE, a photoelectric conversion layer O_RL, and a cathode O_CE. The light sensing anode O_AE may be disposed on the same layer as the first electrode layer. That is, the light sensing anode O_AE may be disposed on the circuit layer DP_CL, and may be simultaneously formed through the same process as the first anode R_AE.

The second film opening PDL-OP2 of the pixel defining layer PDL exposes at least part of the light sensing anode O_AE. The photoelectric conversion layer O_RL is disposed on the light sensing anode O_AE exposed by the second film opening PDL-OP2. The photoelectric conversion layer O_RL may include an organic photo-sensing material. The photoelectric cathode O_CE may be disposed on the photoelectric conversion layer O_RL. The photoelectric cathode O_CE may be simultaneously formed through the same process as the cathode CE. According to an embodiment, the photoelectric cathode O_CE may be integrated with the cathode CE.

Each of the light sensing anode O_AE and the photoelectric cathode O_CE may receive an electrical signal. The photoelectric cathode O_CE may receive a signal different from that of the light sensing anode O_AE. Accordingly, a predetermined electric field may be formed between the light sensing anode O_AE and the photoelectric cathode O_CE. The photoelectric conversion layer O_RL generates an electrical signal corresponding to the light incident on a sensor. The photoelectric conversion layer O_RL may generate charges by absorbing the energy of the incident light. For example, the photoelectric conversion layer O_RL may include a light-sensitive semiconductor material.

The charges generated by the photoelectric conversion layer O_RL change an electric field between the light sensing anode O_AE and the photoelectric cathode O_CE. The amount of charge generated by the photoelectric conversion layer O_RL may vary depending on whether light is incident onto the light sensing element OPD, the amount of light incident onto the light sensing element OPD, and the intensity of light incident onto the light sensing element OPD. Accordingly, the electric field formed between the light sensing anode O_AE and the photoelectric cathode O_CE may be changed. The light sensing element OPD according to an embodiment of the present disclosure may obtain one of the fingerprint, blood pressure, and touch information of a user through a change in the electric field between the light sensing anode O_AE and the photoelectric cathode O_CE.

However, this is illustrated by way of example. The light sensing element OPD may include a phototransistor that uses the photoelectric conversion layer O_RL as an active layer. In this case, the light sensing element OPD may obtain fingerprint information by sensing the amount of current flowing through the phototransistor. The light sensing element OPD according to an embodiment of the present disclosure may include various photoelectric conversion elements capable of generating electrical signals in response to a change in the amount of light, but the present disclosure is not limited to any particular embodiment.

The encapsulation layer TFE is disposed on the element layer DP_ED. The encapsulation layer TFE includes at least one inorganic layer or at least one organic layer. In an embodiment of the present disclosure, the encapsulation layer TFE may include two inorganic layers and an organic layer disposed therebetween. In an embodiment of the present disclosure, a thin film encapsulation layer may include a plurality of inorganic layers and a plurality of organic layers, which are alternately stacked.

The encapsulation inorganic layer may protect the light emitting element ED_R and the light sensing element OPD from moisture/oxygen, and the encapsulation organic layer may protect the light emitting element ED_R and the light sensing element OPD from foreign substances. The encapsulation inorganic layer may include, for example, a silicon nitride layer, a silicon oxynitride layer, a silicon oxide layer, a titanium oxide layer, an aluminum oxide layer, or the like, but is not limited thereto. The encapsulation organic layer may include, for example, an acryl-based organic layer, and is not limited thereto.

Figure 10:
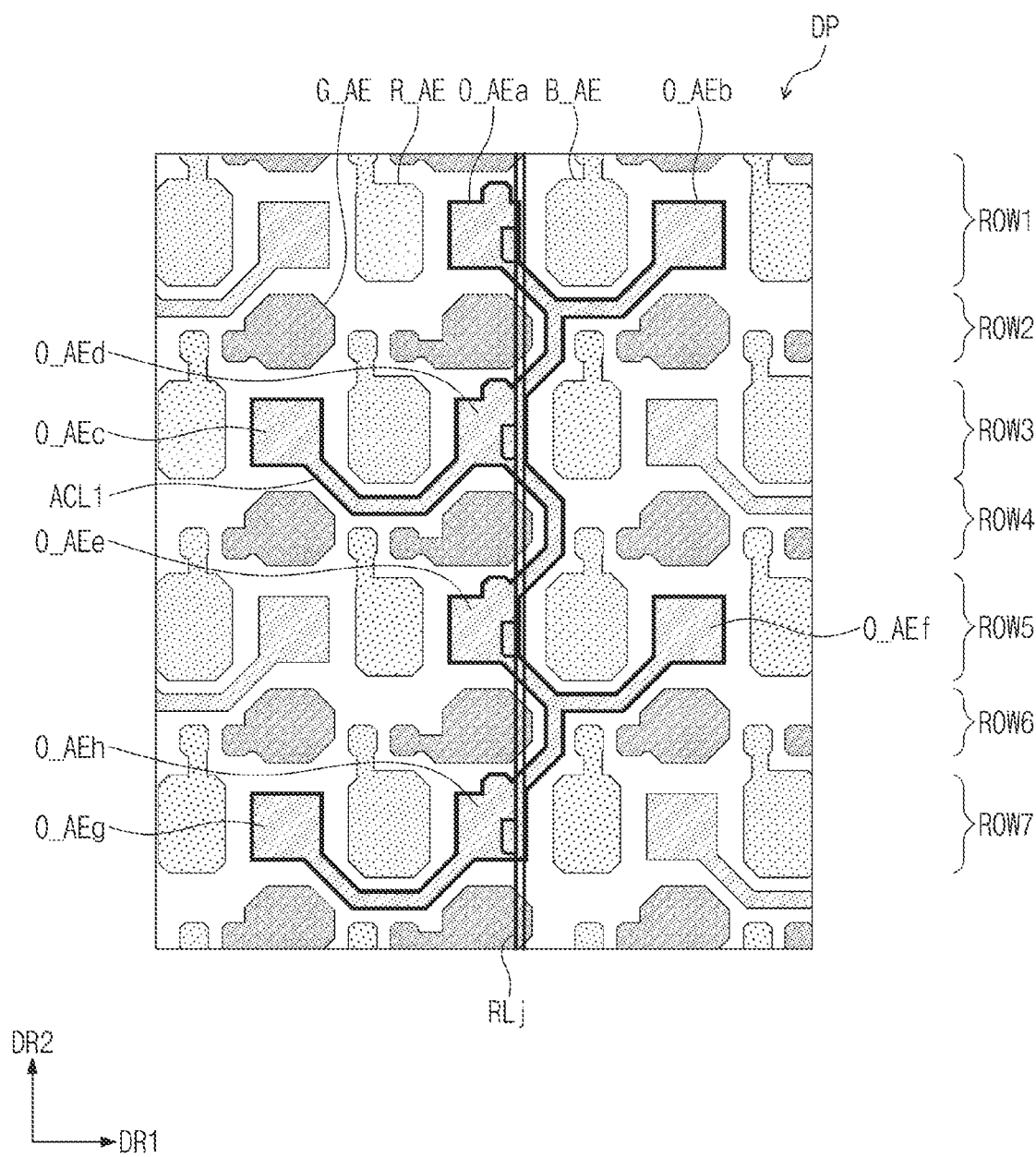
FIG. 10 is a plan view showing a part of a display panel shown in FIG. 3.

FIG. 10 is a plan view showing a part of the display panel DP shown in FIG. 3. FIG. 10 shows the first to third anodes R_AE, G_AE, and B_AE respectively corresponding to the pixels PXR, PXG, and PXB shown in FIG. 4 and light sensing anodes O_AEa to O_AEh of the sensors FX.

Referring to FIGS. 4 and 10, the first anode R_AE, the third anode B_AE, and the light sensing anodes O_AEa to O_AEh are positioned in first, third, fifth, and seventh rows ROW1, ROW3, ROW5, and ROW7 of the display panel DP.

The second anode G_AE is disposed in each of second, fourth, and sixth rows ROW2, ROW4, and ROW6 of the display panel DP.

The light sensing anodes O_AEa to O_AEh include light sensing anodes O_AEa and O_AEb (or first row light sensing anodes) positioned in the first row ROW1, light sensing anodes O_AEc and O_AEd (or third row light sensing anodes) positioned in the third row ROW3, light sensing anodes O_AEe and O_AEf (or fifth row light sensing anodes) positioned in the fifth row ROW5, and light sensing anodes O_AEg and O_AEh (or seventh row light sensing anodes) positioned in the seventh row ROW7.

In an embodiment, the two light sensing anodes O_AEa and O_AEb (or the first row light sensing anodes) positioned in the first row ROW1 are spaced from each other in the first direction DR1. In an embodiment, the two light sensing anodes O_AEc and O_AEd (or the third row light sensing anodes) positioned in the third row ROW3 are spaced from each other in the first direction DR1. In an embodiment, the two light sensing anodes O_AEe and O_AEf (or the fifth light sensing anodes) positioned in the fifth row ROW5 are spaced from each other in the first direction DR1. In an embodiment, the two light sensing anodes O_AEg and O_AEh (or the seventh row light sensing anodes) positioned in the seventh row ROW7 are spaced from each other in the first direction DR1.

The first row light sensing anodes O_AEa and O_AEb, the third row light sensing anodes O_AEc and O_AEd, the fifth row light sensing anodes O_AEe and O_AEf, and the seventh row light sensing anodes O_AEg and O_AEh are spaced from each other in the second direction DR2.

In an embodiment, y (e.g., 8) of the light sensing anodes O_AEa to O_AEh positioned in the first, third, fifth, and seventh rows ROW1, ROW3, ROW5, and ROW7 are electrically connected to each other through an anode connection line ACL1, where y is a positive integer. In an embodiment, the anode connection line ACL1 may be formed of the same material in the same layer as the light sensing anodes O_AEa to O_AEh.

The light sensing anodes O_AEa and O_AEb positioned in the first row ROW1, the light sensing anodes O_AEc and O_AEd positioned in the third row ROW3, the light sensing anodes O_AEe and O_AEf positioned in the fifth row ROW5, and the light sensing anodes O_AEg and O_AEh positioned in the seventh row ROW7 may be electrically connected to each other through the anode connection line ACL1.

Referring to FIG. 7, the light sensing anode O_AE of the light sensing element OPD is connected to the first sensing node SN1. As the eight light sensing anodes O_AEa to O_AEh shown in FIG. 10 are connected in common, photocharges generated by eight light sensing elements OPD in the eight sensors FX may be commonly accumulated in the first sensing node SN1.

As shown in FIGS. 3 and 10, the readout line RLj extends in the second direction DR2 and is commonly connected to the sensors FX positioned in the j-th column.

Accordingly, the sensing signal FSj corresponding to photocharges generated by the eight light sensing elements OPD in the eight sensors FX may be delivered to the readout line RLj.

As described above, during a blood pressure measurement mode, the light sensing element OPD may generate photocharges corresponding to light reflected from blood vessels located under a dermal layer of the user's skin. Because a change in systolic and diastolic blood volume of a heart is minute, a change in the amount of reflected light is not large.

According to an embodiment of the present disclosure, photocharges generated by the eight light sensing elements OPD may be commonly accumulated in the first sensing node SN1. When the amount of photocharges accumulated in the first sensing node SN1 increases, the amount of current of the sensing signal FSj transmitted to the readout line RLj may increase. Accordingly, embodiments of the present disclosure may more accurately detect the amount of change in the amount of blood during the systole and diastole of a heart.

Figure 11:
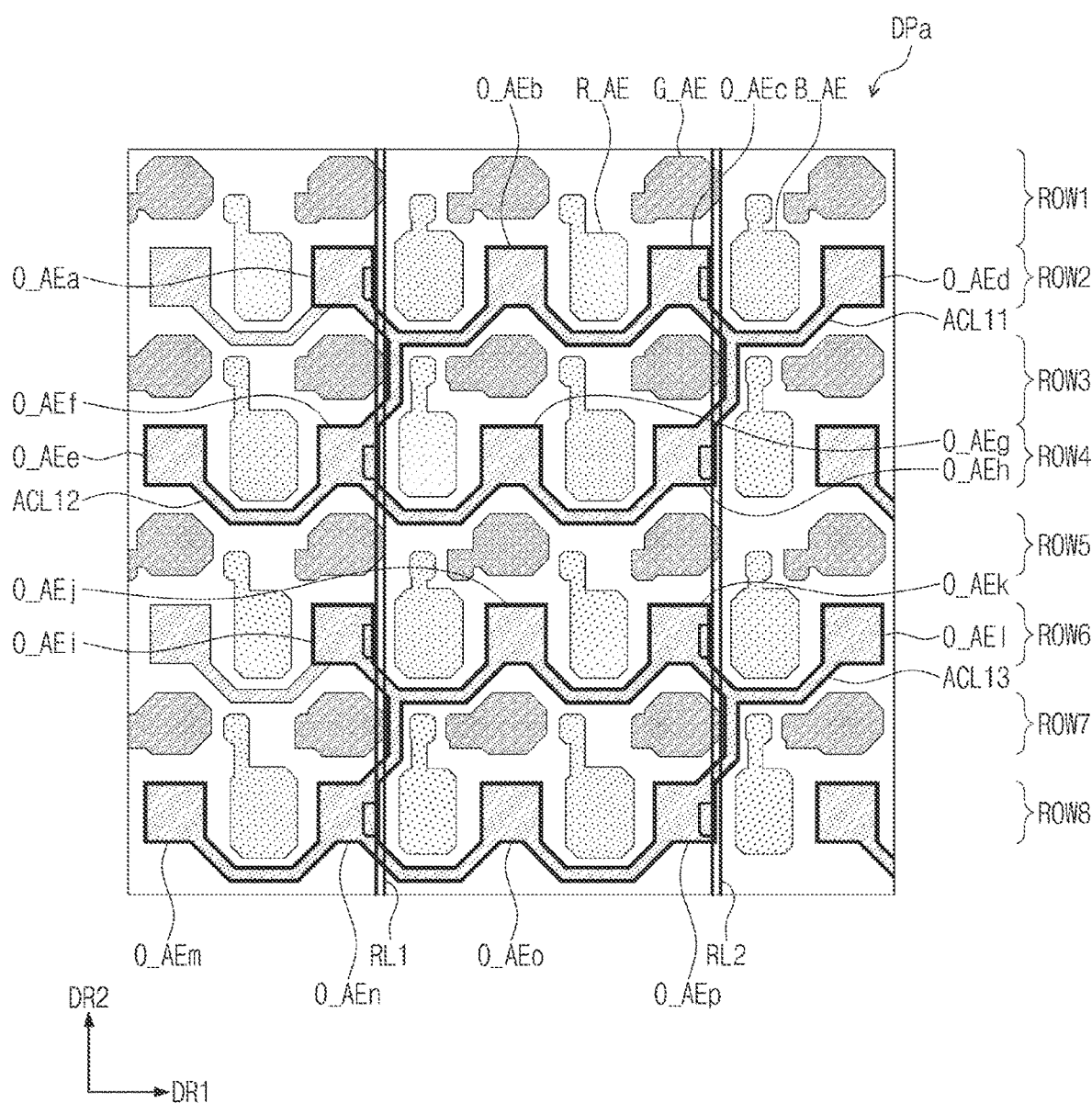
FIG. 11 is a plan view showing a part of a display panel, according to an embodiment of the present disclosure.

FIG. 11 is a plan view showing a part of a display panel DPa, according to an embodiment of the present disclosure. FIG. 11 shows the first to third anodes R_AE, G_AE, and B_AE respectively corresponding to the pixels PXR, PXG, and PXB shown in FIG. 4 and light sensing anodes O_AEa to O_AEp of the sensors FX.

Referring to FIGS. 4 and 11, the first anode R_AE, the third anode B_AE, and the light sensing anodes O_AEa to O_AEp are positioned in second, fourth, sixth, and eighth rows ROW2, ROW4, ROW6, and ROW8 of the display panel DP.

The second anode G_AE is disposed in each of the first, third, fifth, and seventh rows ROW1, ROW3, ROW5, and ROW7 of the display panel DP.

The light sensing anodes O_AEa to O_AEp include the light sensing anodes O_AEa, O_AEb, O_AEc, and O_AEd positioned in the second row ROW2, the light sensing anodes O_AEe, O_AEf, O_AEg, and O_AEh positioned in the fourth row ROW4, the light sensing anodes O_AEi, O_AEj, O_AEk, and O_AEl positioned in the sixth row ROW6, and the light sensing anodes O_AEm, O_AEn, O_AEo, and O_AEp positioned in the eighth row ROW8.

In an embodiment, y (e.g., 8) of the light sensing anodes O_AEa to O_AEh positioned in the second and fourth rows ROW2 and ROW4 are electrically connected to each other through an anode connection line ACL11. y (e.g., 8) of the light sensing anodes O_AEi to O_AEp positioned in the sixth and eighth rows ROW6 and ROW8 are electrically connected to each other through an anode connection line ACL13.

The readout line RL1 extends in the second direction DR2 and is commonly connected to the sensors FX positioned in the second row ROW2 and the fourth row ROW4.

The readout line RL2 extends in the second direction DR2 and is commonly connected to the sensors FX positioned in the sixth row ROW6 and the eighth row ROW8.

According to an embodiment of the present disclosure, a current amount of the sensing signal FS1 for delivering photocharges generated by the eight light sensing elements OPD to the readout line RL1 may increase. A current amount of the sensing signal FS2 for delivering photocharges generated by the eight light sensing elements OPD to the readout line RL2 may increase. Accordingly, embodiments of the present disclosure may more accurately detect the amount of change in the amount of blood during the systole and diastole of a heart.

Figure 12:
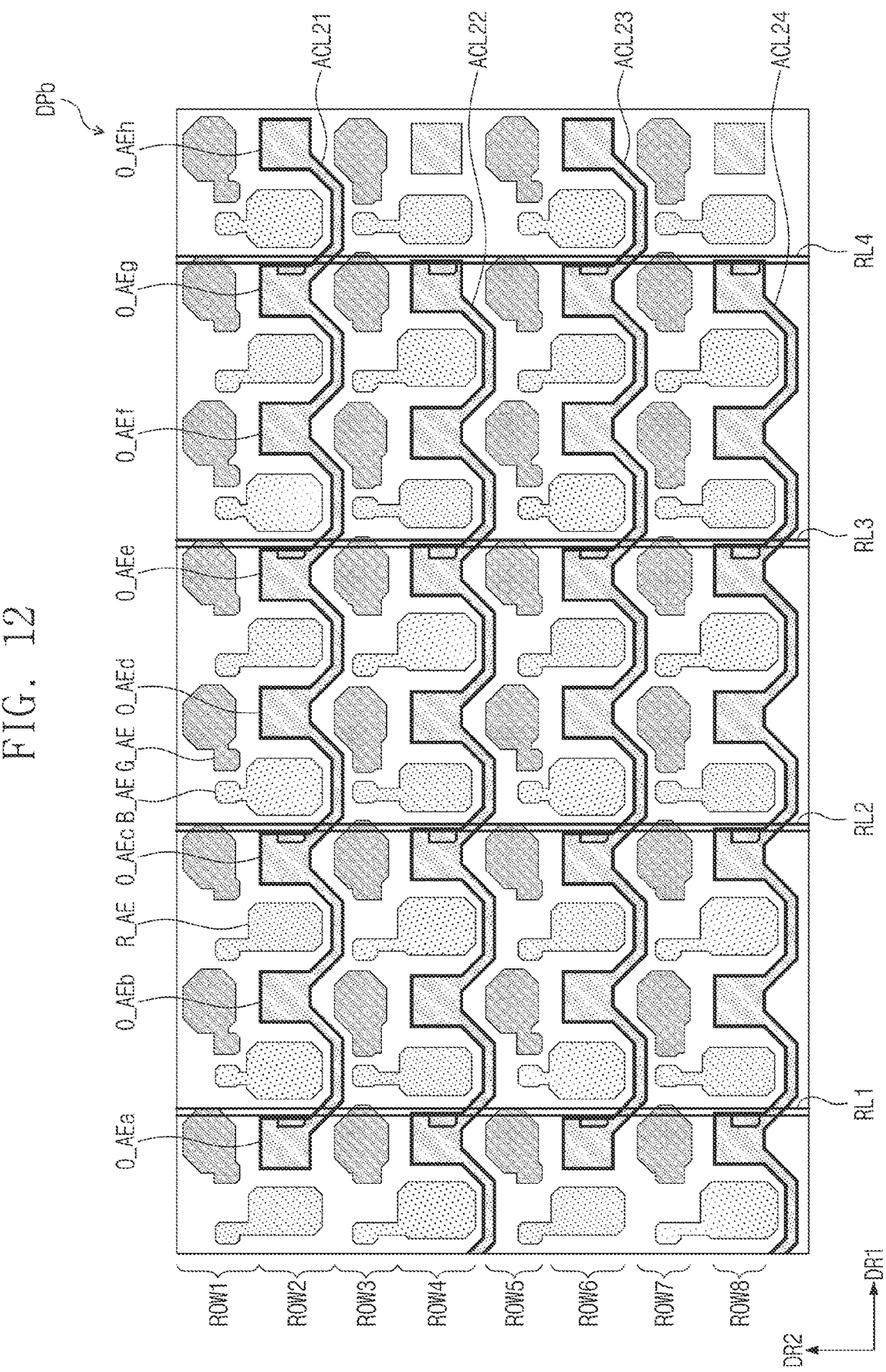
FIG. 12 is a plan view showing a part of a display panel, according to an embodiment of the present disclosure.

FIG. 12 is a plan view showing a part of a display panel DPb, according to an embodiment of the present disclosure. FIG. 12 shows the first to third anodes R_AE, G_AE, and B_AE respectively corresponding to the pixels PXR, PXG, and PXB shown in FIG. 4 and light sensing anodes of the sensors FX.

Referring to FIGS. 4 and 12, the first anode R_AE, the third anode B_AE, and the light sensing anodes are positioned in each of the second, fourth, sixth, and eighth rows ROW2, ROW4, ROW6, and ROW8 of the display panel DP. For example, the light sensing anodes O_AEa to O_AEh are positioned in the second row ROW2 of the display panel DP.

In an embodiment, the eight light sensing anodes O_AEa to O_AEh positioned in the second row ROW2 are electrically connected to each other through an anode connection line ACL21. Eight light sensing anodes positioned in the fourth row ROW4 are electrically connected to each other through an anode connection line ACL22. Eight light sensing anodes positioned in the sixth row ROW6 are electrically connected to each other through an anode connection line ACL23. Eight light sensing anodes positioned in the eighth row ROW8 are electrically connected to each other through an anode connection line ACL24.

The readout line RL1 extends in the second direction DR2 and is commonly connected to the sensors FX positioned in the second row ROW2. The readout line RL2 extends in the second direction DR2 and is commonly connected to the sensors FX positioned in the fourth row ROW4. The readout line RL3 extends in the second direction DR2 and is commonly connected to the sensors FX positioned in the sixth row ROW6. The readout line RL4 extends in the second direction DR2 and is commonly connected to the sensors FX positioned in the eighth row ROW8.

As shown in FIGS. 10, 11, and 12, as light sensing anodes of the light sensing element OPD in the plurality of sensors FX are connected in common, a change in blood volume during the systole and diastole of a heart may be more accurately sensed. Moreover, a method of connecting light sensing anodes of the light sensing element OPD in the plurality of sensors FX may be changed in various ways.

Figure 13:
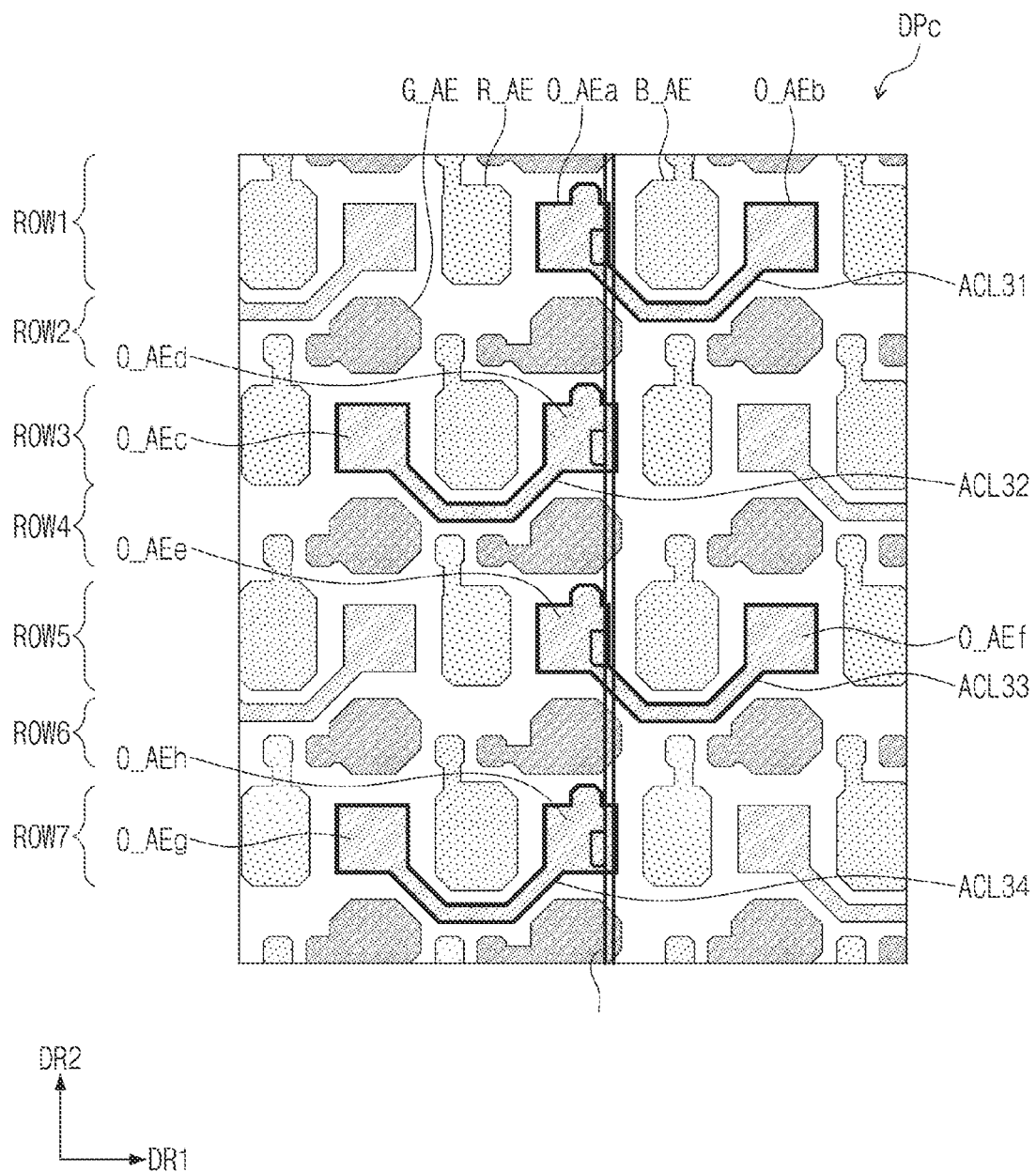
FIG. 13 is a plan view showing a part of a display panel, according to an embodiment of the present disclosure.

FIG. 13 is a plan view showing a part of a display panel DPc, according to an embodiment of the present disclosure. FIG. 10 shows the first to third anodes R_AE, G_AE, and B_AE respectively corresponding to the pixels PXR, PXG, and PXB shown in FIG. 4 and light sensing anodes O_AEa to O_AEh of the sensors FX.

Referring to FIGS. 4 and 13, the first anode R_AE, the third anode B_AE, and the light sensing anodes O_AEa to O_AEh are positioned in first, third, fifth, and seventh rows ROW1, ROW3, ROW5, and ROW7 of the display panel DP.

The second anode G_AE is disposed in each of second, fourth, and sixth rows ROW2, ROW4, and ROW6 of the display panel DP.

The light sensing anodes O_AEa to O_AEh include the light sensing anodes O_AEa and O_AEb positioned in the first row ROW1, the light sensing anodes O_AEc and O_AEd positioned in the third row ROW3, the light sensing anodes O_AEe and O_AEf positioned in the fifth row ROW5, and the light sensing anodes O_AEg and O_AEh positioned in the seventh row ROW7.

In an embodiment, the two light sensing anodes O_AEa and O_AEb (or the first row light sensing anodes) positioned in the first row ROW1 are spaced apart from each other in the first direction DR1, and are electrically connected to each other through an anode connection line ACL31. The two light sensing anodes O_AEc and O_AEd (or the third row light sensing anodes) positioned in the third row ROW3 are spaced apart from each other in the first direction DR1, and are electrically connected to each other through an anode connection line ACL32. The two light sensing anodes O_AEe and O_AEf (or the fifth row light sensing anodes) positioned in the fifth row ROW5 are spaced apart from each other in the first direction DR1, and are electrically connected to each other through an anode connection line ACL33. The two light sensing anodes O_AEg and O_AEh (or the seventh row light sensing anodes) positioned in the seventh row ROW7 are spaced apart from each other in the first direction DR1, and are electrically connected to each other through an anode connection line ACL34.

The first row light sensing anodes O_AEa and O_AEb, the third row light sensing anodes O_AEc and O_AEd, the fifth row light sensing anodes O_AEe and O_AEf, and the seventh row light sensing anodes O_AEg and O_AEh are spaced apart from each other in the second direction DR2.

The readout line RLj extends in the second direction DR2 and is commonly connected to the sensors FX positioned in the j-th column.

As described with reference to FIGS. 7 and 8, when the sensor scan signal Si is at a low level, a sensing signal FSj corresponding to a current flowing through the amplification transistor ST2 may be output to the readout line RLj.

That is, when a sensor scan signal S1 (see FIG. 14) corresponding to the first row ROW1 is at a low level, the sensing signal FSj from the sensors FX corresponding to the light sensing anodes O_AEa and O_AEb may be output to the readout line RLj.

Furthermore, when a sensor scan signal S3 (see FIG. 14) corresponding to the third row ROW3 is at a low level, the sensing signal FSj from the sensors FX corresponding to the light sensing anodes O_AEc and O_AEd may be output to the readout line RLj.

Furthermore, when a sensor scan signal S5 (see FIG. 14) corresponding to the fifth row ROW5 is at a low level, the sensing signal FSj from the sensors FX corresponding to the light sensing anodes O_AEe and O_AEf may be output to the readout line RLj.

Furthermore, when a sensor scan signal S7 (see FIG. 14) corresponding to the seventh row ROW7 is at a low level, the sensing signal FSj from the sensors FX corresponding to the light sensing anodes O_AEg and O_AEh may be output to the readout line RLj.

FIG. 13 shows two light sensing anodes (e.g., the two light sensing anodes O_AEa and O_AEb positioned in the first row ROW1) positioned in one row connected in common, but the present disclosure is not limited thereto. For example, in an embodiment, the light sensing anodes positioned in one row may be positioned independently from each other while not electrically connected to each other. The sensors FX positioned in one row may be connected to different readout lines.

Figure 14:
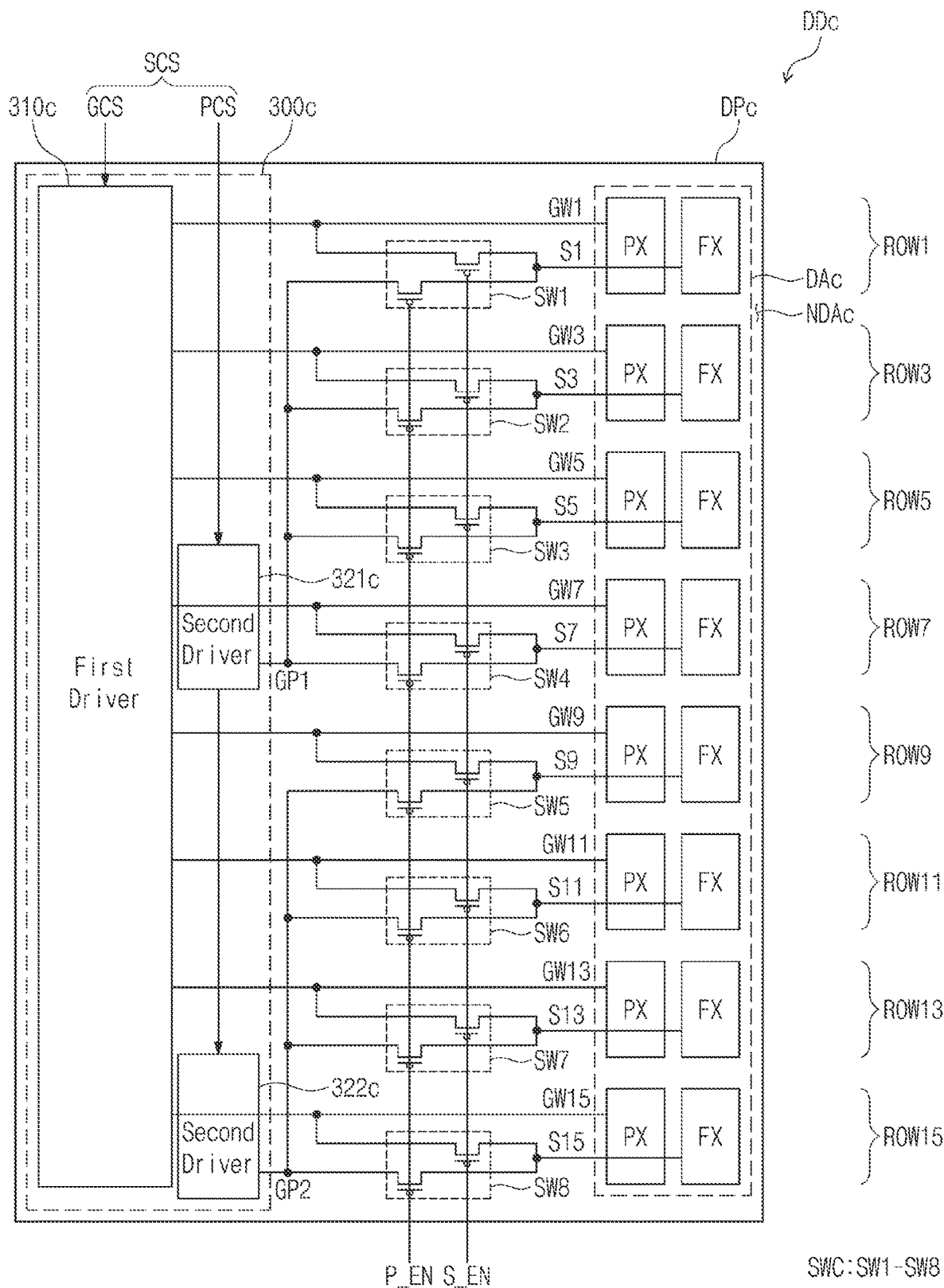
FIG. 14 is a block diagram showing a display device, according to an embodiment of the present disclosure.

FIG. 14 is a block diagram showing a display device DDc, according to an embodiment of the present disclosure.

Referring to FIG. 14, the display device DDc includes the pixels PX, the sensors FX, a scan and sensor driver 300c, and a switching circuit SWC positioned on a display panel DPc. In an embodiment, the pixels PX and the sensors FX may be positioned in a display area DAc of the display panel DPc, and the scan and sensor driver 300c and the switching circuit SWC may be positioned in a non-display area NDAc.

According to embodiments, the display device DDc may further include the driving controller 100, the data driver 200, the light emitting driver 400, the readout circuit 500, and the voltage generator 600 as shown in FIG. 3.

FIG. 14 shows the pixels PX and the sensors FX that are positioned in odd-numbered rows ROW1, ROW3, ROW5, ROW7, ROW9, ROW11, ROW13, and ROW15, but the present disclosure is not limited thereto. For example, according to embodiments, the display panel DPc may further include the pixels PX and the sensors FX positioned in even-numbered rows.

The pixels FX in the first, third, fifth, and seventh rows ROW1, ROW3, ROW5, and ROW7 shown in FIG. 14 may include the light sensing anodes O_AEa, O_AEd, O_AEe, and O_AEh in the first, third, fifth, and seventh rows ROW1, ROW3, ROW5, and ROW7 shown in FIG. 13, respectively.

The scan and sensor driver 300c includes a first driver 310c and second drivers 321c and 322c.

The first driver 310c outputs the scan signals GW1, GW3, GW5, GW7, GW9, GW11, GW13, and GW15 in response to a first control signal GCS included in the scan control signal SCS. FIG. 14 shows that the first driver 310 outputs the odd-numbered scan signals GW1, GW3, GW5, GW7, GW9, GW11, GW13, and GW15 corresponding to the pixels PX positioned in the odd-numbered rows ROW1, ROW3, ROW5, ROW7, ROW9, ROW11, ROW13, and ROW15, but the present disclosure is not limited thereto. That is, the first driver 310c may further output even-numbered scan signals corresponding to the pixels PX disposed in even-numbered rows.

The scan signals GW1, GW3, GW5, GW7, GW9, GW11, GW13, and GW15 output from the first driver 310c may be respectively provided to the pixels PX.

The second drivers 321c and 322c respectively output group sensor signals GP1 and GP2 in response to a second control signal PCS included in the scan control signal SCS. The scan control signal SCS may be provided by the driving controller 100 (see FIG. 3).

The switching circuit SWC receives the scan signals GW1, GW3, GW5, GW7, GW9, GW11, GW13, and GW15 output from the first driver 310c and the group sensor signals GP1 and GP2 output from the second drivers 321c and 322c, and outputs sensor scan signals S1, S3, S5, S7, S9, S11, S13, and S15 in response to first and second enable signals S_EN and P_EN. The sensor scan signals S1, S3, S5, S7, S9, S11, S13, and S15 may be provided to the sensors FX, respectively.

The switching circuit SWC includes switches SW1 to SW8. When the first enable signal S_EN is at an active level (e.g., a low level), the switches SW1 to SW8 output the scan signals GW1, GW3, GW5, GW7, GW9, GW11, GW13, and GW15, which are output from the first driver 310c, as the sensor scan signals S1, S3, S5, S7, S9, S11, S13, and S15.

When the second enable signal P_EN is at an active level (e.g., a low level), the switches SW1 to SW4 output the group sensor signal GP1, which is output from the second driver 321c, as the sensor scan signals S1, S3, S5, and S7. When the second enable signal P_EN is at an active level (e.g., a low level), the switches SW5 to SW8 output the group sensor signal GP2, which is output from the second driver 322c, as the sensor scan signals S9, S11, S13, and S15.

Figure 15:
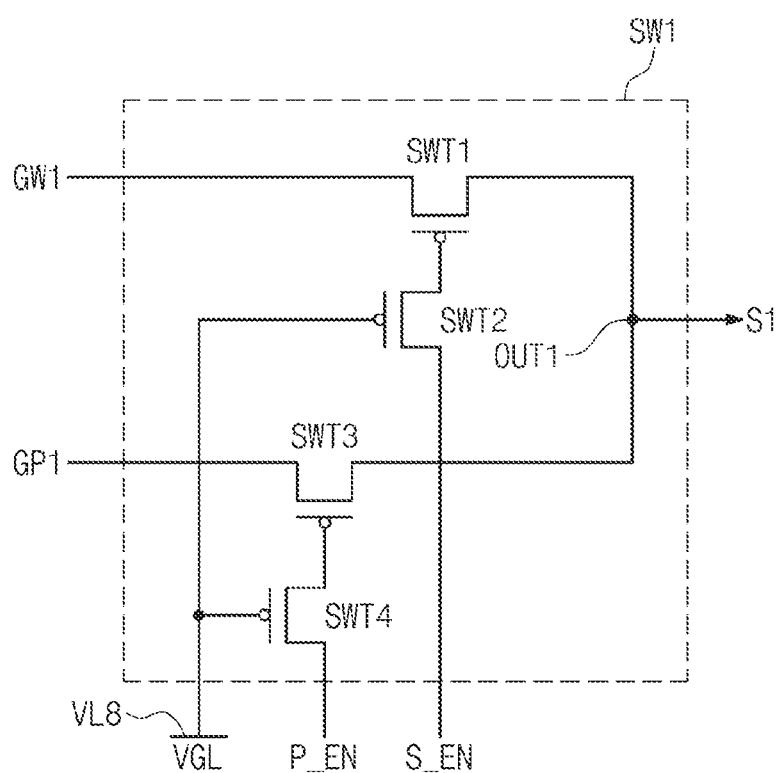
FIG. 15 is a circuit diagram of a switch shown in FIG. 14, according to an embodiment of the present disclosure.

FIG. 15 is a circuit diagram of the switch SW1 shown in FIG. 14, according to an embodiment of the present disclosure.

Referring to FIG. 15, the switch SW1 includes switching transistors SWT1, SWT2, SWT3, and SWT4. The switching transistor SWT1 includes a first electrode that receives the scan signal GW1, a second electrode connected to a first output node OUT1, and a gate electrode.

The switching transistor SWT2 includes a first electrode that receives the first enable signal S_EN, a second electrode connected to the gate electrode of the switching transistor SWT1, and a gate electrode connected to a voltage line VL8.

The switching transistor SWT3 includes a first electrode that receives the group sensor signal GP1, a second electrode connected to the first output node OUT1, and a gate electrode.

The switching transistor SWT4 includes a first electrode that receives the second enable signal P_EN, a second electrode connected to the gate electrode of the switching transistor SWT3, and a gate electrode connected to the voltage line VL8.

The voltage line VL8 receives a voltage VGL that has a voltage level at which the switching transistors SWT2 and SWT4 are capable of being turned on. Accordingly, the switching transistors SWT2 and SWT4 may be turned on.

When the first enable signal S_EN is at a low level, the switching transistor SWT1 is turned on and delivers the scan signal GW1 to the output node OUT1.

When the second enable signal P_EN is at a low level, the switching transistor SWT3 is turned on and delivers the group sensor signal GP1 to the output node OUT1.

In a fingerprint sensing mode, the first enable signal S_EN is at an active level (e.g., a low level), and the second enable signal P_EN is at an inactive level (e.g., a high level). Accordingly, the switch SW1 may output the scan signal GW1 as the sensor scan signal S1.

In a blood pressure sensing mode, the first enable signal S_EN is at an inactive level (e.g., a high level), and the second enable signal P_EN is at an active level (e.g., a low level). Accordingly, the switch SW1 may output the group sensor signal GP1 as the sensor scan signal S1.

In an embodiment, the switch SW1 does not include the switching transistors SWT2 and SWT4. In this case, the first enable signal S_EN may be directly provided to the gate electrode of the switching transistor SWT1, and the second enable signal P_EN may be directly provided to the gate electrode of the switching transistor SWT3.

Each of the switches SW2 to SW8 shown in FIG. 14 may include the same circuit configuration as the switch SW1 shown in FIG. 15.

Figure 16:
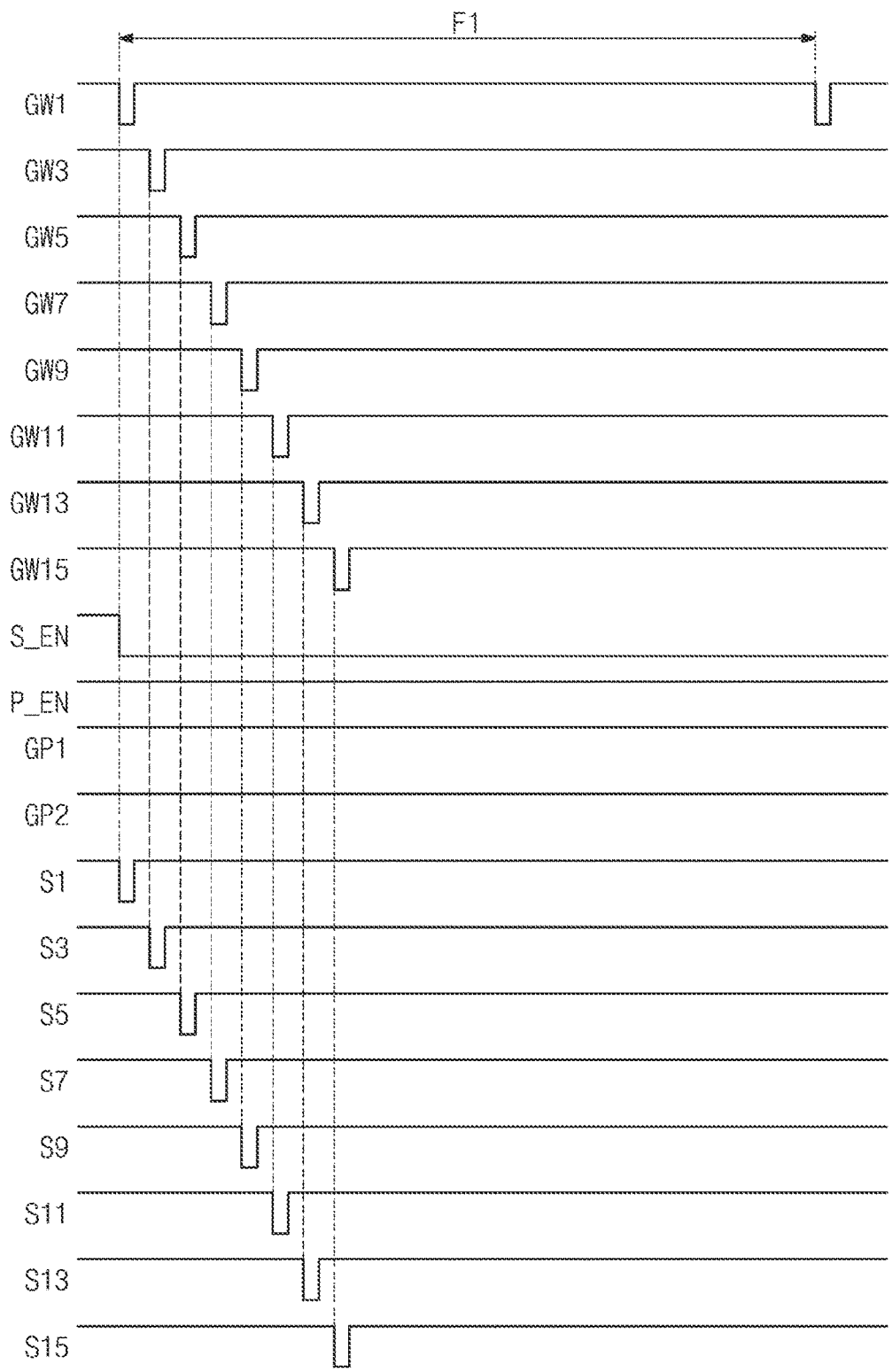
FIG. 16 is a timing diagram for describing an operation of a display panel shown in FIG. 14 in a fingerprint sensing mode.

FIG. 16 is a timing diagram for describing an operation of the display panel DPc shown in FIG. 14 in a fingerprint sensing mode.

Referring to FIGS. 14 and 16, during one frame F1, the scan signals GW1, GW3, GW5, GW7, GW9, GW11, GW13, and GW15, which are output from the first driver 310, sequentially transition to low levels.

In a fingerprint sensing mode, the first enable signal S_EN is at an active level (e.g., a low level), and the second enable signal P_EN is at an inactive level (e.g., a high level). Accordingly, the switching circuit SWC outputs the scan signals GW1, GW3, GW5, GW7, GW9, GW11, GW13, and GW15 as the sensor scan signals S1, S3, S5, S7, S9, S11, S13, and S15, respectively.

The sensors FX shown in FIG. 14 operate in response to the sensor scan signals S1, S3, S5, S7, S9, S11, S13, and S15 activated at low levels at different timings. During the fingerprint sensing mode, the light sensing element OPD (see FIG. 7) may generate photocharges corresponding to light reflected by a ridge of a fingerprint or a valley between ridges of the fingerprint. The sensors FX positioned in a plurality of rows output different sensing signals, which may increase the light sensing precision of the sensors FX. Accordingly, the fingerprint sensing performance of the sensor FX may be increased during the fingerprint sensing mode.

Figure 17:
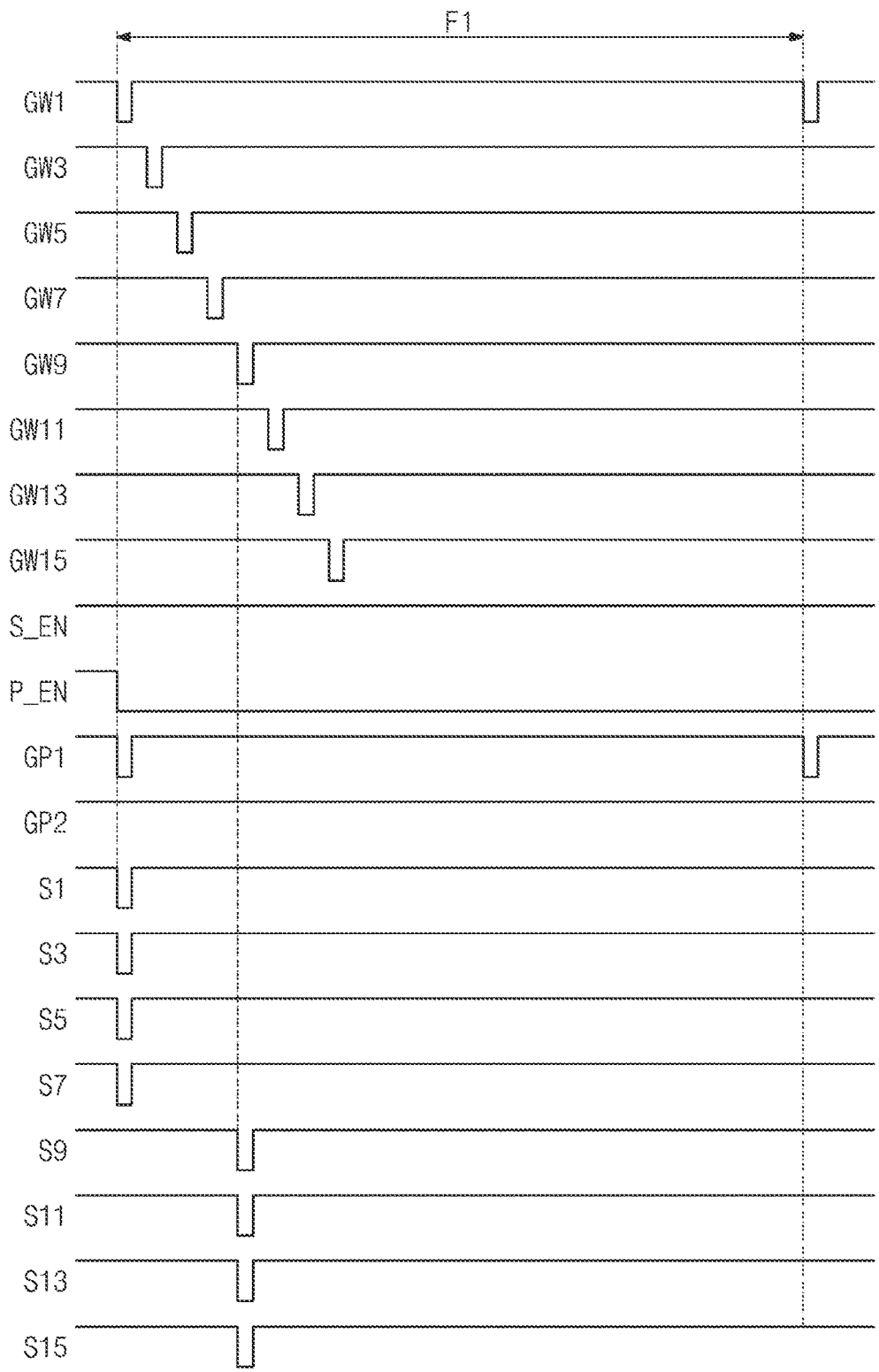
FIG. 17 is a timing diagram for describing an operation of a display panel shown in FIG. 14 in a blood pressure sensing mode.

FIG. 17 is a timing diagram for describing an operation of the display panel DPc shown in FIG. 14 in a blood pressure sensing mode.

Referring to FIGS. 14 and 17, during one frame F1, the scan signals GW1, GW3, GW5, GW7, GW9, GW11, GW13, and GW15, which are output from the first driver 310, sequentially transition to low levels. That is, the scan signals GW1, GW3, GW5, GW7, GW9, GW11, GW13, and GW15 may be different signals transitioning to active levels (e.g., low levels) at different timings.

In a blood pressure sensing mode, the first enable signal S_EN is at an inactive level (e.g., a high level), and the second enable signal P_EN is at an active level (e.g., a low level). Accordingly, the switching circuit SWC outputs the group sensor signal GP1 as the sensor scan signals S1, S3, S5, and S7, and outputs the group sensor signal GP2 as the sensor scan signals S9, S11, S13, and S15.

In an embodiment, the group sensor signal GP1 may be the same as one of scan signals GW1, GW3, GW5, and GW7. In an embodiment, the group sensor signal GP2 may be the same as one of scan signals GW9, GW11, GW13, and GW15.

Among the sensors FX shown in FIG. 14, the pixels FX in the first, third, fifth, and seventh rows ROW1, ROW3, ROW5, and ROW7 operate in response to the sensor scan signals S1, S3, S5, and S7. The pixels FX in the ninth, eleventh, thirteenth, and fifteenth rows ROW9, ROW11, ROW13, and ROW15 operate in response to the sensor scan signals S9, S11, S13, and S15.

During the blood pressure sensing mode, the light sensing element OPD may generate photocharges corresponding to light reflected from blood vessels located under a dermal layer of a user's skin. Because a change in systolic and diastolic blood volume of a heart is minute, a change in the amount of reflected light is not large.

When the sensor scan signals S1, S3, S5, and S7 transition to low levels at the same time, the sensing signal FSj from the sensors FX in four rows may be delivered to the readout line RLj at the same time. That is, the amount of current of the sensing signal FSj delivered to the readout line RLj increases, thereby accurately sensing a change in blood volume during the systole and diastole of a heart. Accordingly, the blood pressure sensing performance of the sensor FX may be increased during the blood pressure sensing mode.

Figure 18:
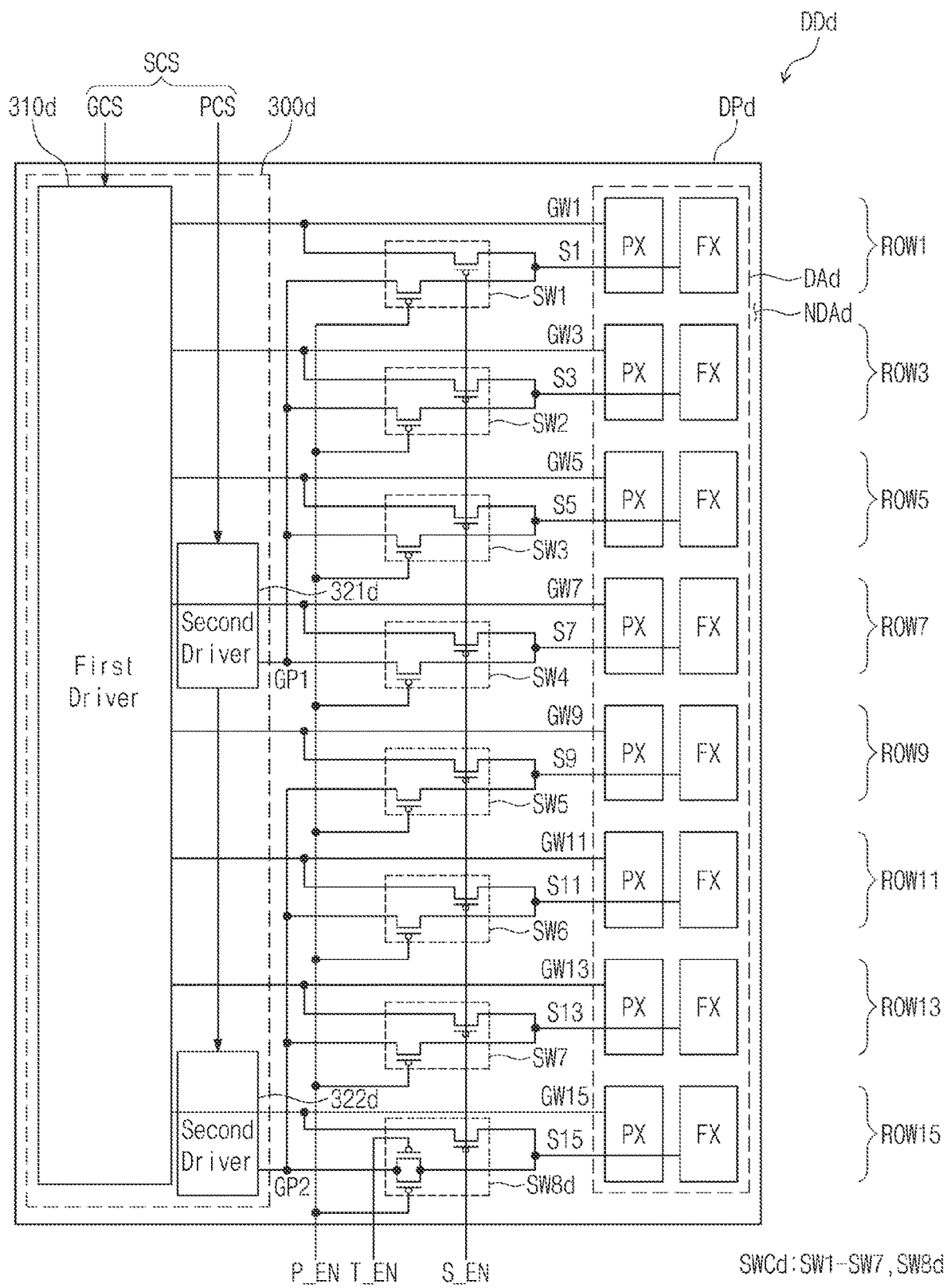
FIG. 18 is a block diagram showing a display device, according to an embodiment of the present disclosure.

FIG. 18 is a block diagram showing a display device DDd, according to an embodiment of the present disclosure.

Referring to FIG. 18, the display device DDd includes the pixels PX, the sensors FX, a scan and sensor driver 300d, and a switching circuit SWCd positioned on a display panel DPd. In an embodiment, the pixels PX and the sensors FX may be positioned in a display area DAd of the display panel DPd, and the scan and sensor driver 300d and the switching circuit SWCd may be positioned in a non-display area NDAd. The scan and sensor driver 300d includes a first driver 310d and second drivers 321d and 322d.

According to embodiments, the display device DDd may further include the driving controller 100, the data driver 200, the light emitting driver 400, the readout circuit 500, and the voltage generator 600 as shown in FIG. 3.

The display device DDd shown in FIG. 18 includes a configuration similar to that of the display device DDc shown in FIG. 14. For convenience of explanation, a further description of components and technical aspects previously described with reference to the display device DDc shown in FIG. 14 may be omitted.

Referring to FIG. 18, the switching circuit SWCd receives the scan signals GW1, GW3, GW5, GW7, GW9, GW11, GW13, and GW15 output from the first driver 310d and the group sensor signals GP1 and GP2 output from the second drivers 321d and 322d, and outputs the sensor scan signals S1, S3, S5, S7, S9, S11, S13, and S15 in response to first, second, and third enable signals S_EN, P_EN, and T_EN. The sensor scan signals S1, S3, S5, S7, S9, S11, S13, and S15 may be provided to the sensors FX, respectively.

The switching circuit SWCd includes switches SW1 to SW7 and SW8d. When the first enable signal S_EN is at an active level (e.g., a low level), each of the switches SW1 to SW7 and SW8d operates in the same way as the switches SW1 to SW8 shown in FIG. 14. That is, when the first enable signal S_EN is at an active level (e.g., a low level), the switches SW1 to SW7 and SW8d output the scan signals GW1, GW3, GW5, GW7, GW9, GW11, GW13, and GW15, which are output from the first driver 310d, as the sensor scan signals S1, S3, S5, S7, S9, S11, S13, and S15.

When the second enable signal P_EN is at an active level (e.g., a low level), the switches SW1 to SW4 output the group sensor signal GP1, which is output from the second driver 321d, as the sensor scan signals S1, S3, S5, and S7. When the second enable signal P_EN is at an active level (e.g., a low level), the switches SW5 to SW7 output the group sensor signal GP2, which is output from the second driver 322d, as the sensor scan signals S9, S11, S13, and S15.

When each of the first enable signal S_EN and the second enable signal P_EN is at an inactive level (e.g., a high level), all of the first to seventh switches SW1 to SW7 are turned off.

When the third enable signal T_EN is at an active level (e.g., a low level), the switch SW8d outputs the group sensor signal GP2 output from the second driver 322d as the sensor scan signal S15.

An operation of the display panel DPd shown in FIG. 18 in a fingerprint sensing mode may be the same as that of the display panel DPc described with reference to FIG. 16.

Referring to FIGS. 16 and 18, in the fingerprint sensing mode, the first enable signal S_EN is at an active level (e.g., a low level), and each of the second enable signal P_EN and the third enable signal T_EN is at an inactive level (e.g., a high level). Accordingly, the switching circuit SWCd outputs the scan signals GW1, GW3, GW5, GW7, GW9, GW11, GW13, and GW15, which are output from the first driver 310d, as the sensor scan signals S1, S3, S5, S7, S9, S11, S13, and S15, respectively.

Figure 19:
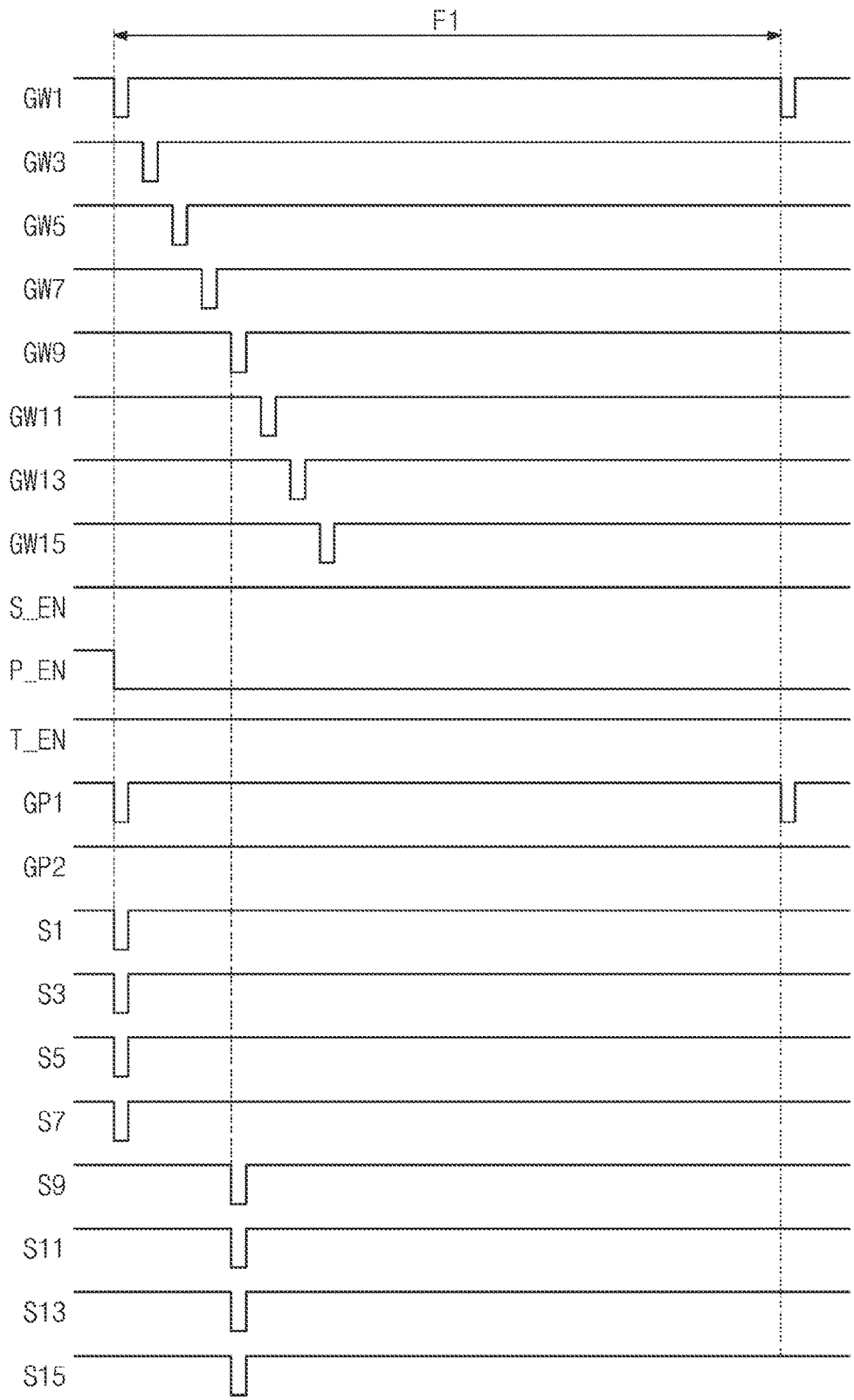
FIG. 19 is a timing diagram for describing an operation of a display panel shown in FIG. 18 in a blood pressure sensing mode.

FIG. 19 is a timing diagram for describing an operation of the display panel DPd shown in FIG. 18 in a blood pressure sensing mode.

Referring to FIGS. 18 and 19, during the one frame F1, the scan signals GW1, GW3, GW5, GW7, GW9, GW11, GW13, and GW15, which are output from the first driver 310d, sequentially transition to low levels.

In a blood pressure sensing mode, each of the first enable signal S_EN and the third enable signal T_EN is at an inactive level (e.g., a high level), and the second enable signal P_EN is at an active level (e.g., a low level). Accordingly, the switching circuit SWCd outputs the group sensor signal GP1 as the sensor scan signals S1, S3, S5, and S7, and outputs the group sensor signal GP2 as the sensor scan signals S9, S11, S13, and S15.

In an embodiment, the group sensor signal GP1 may be the same as one of scan signals GW1, GW3, GW5, and GW7. In an embodiment, the group sensor signal GP2 is the same as one of scan signals GW9, GW11, GW13, and GW15. That is, a frequency of each of the group sensor signals GP1 and GP2 is the same as a frequency of each of the scan signals GW1, GW3, GW5, GW7, GW9, GW11, GW13, and GW15.

Figure 20:
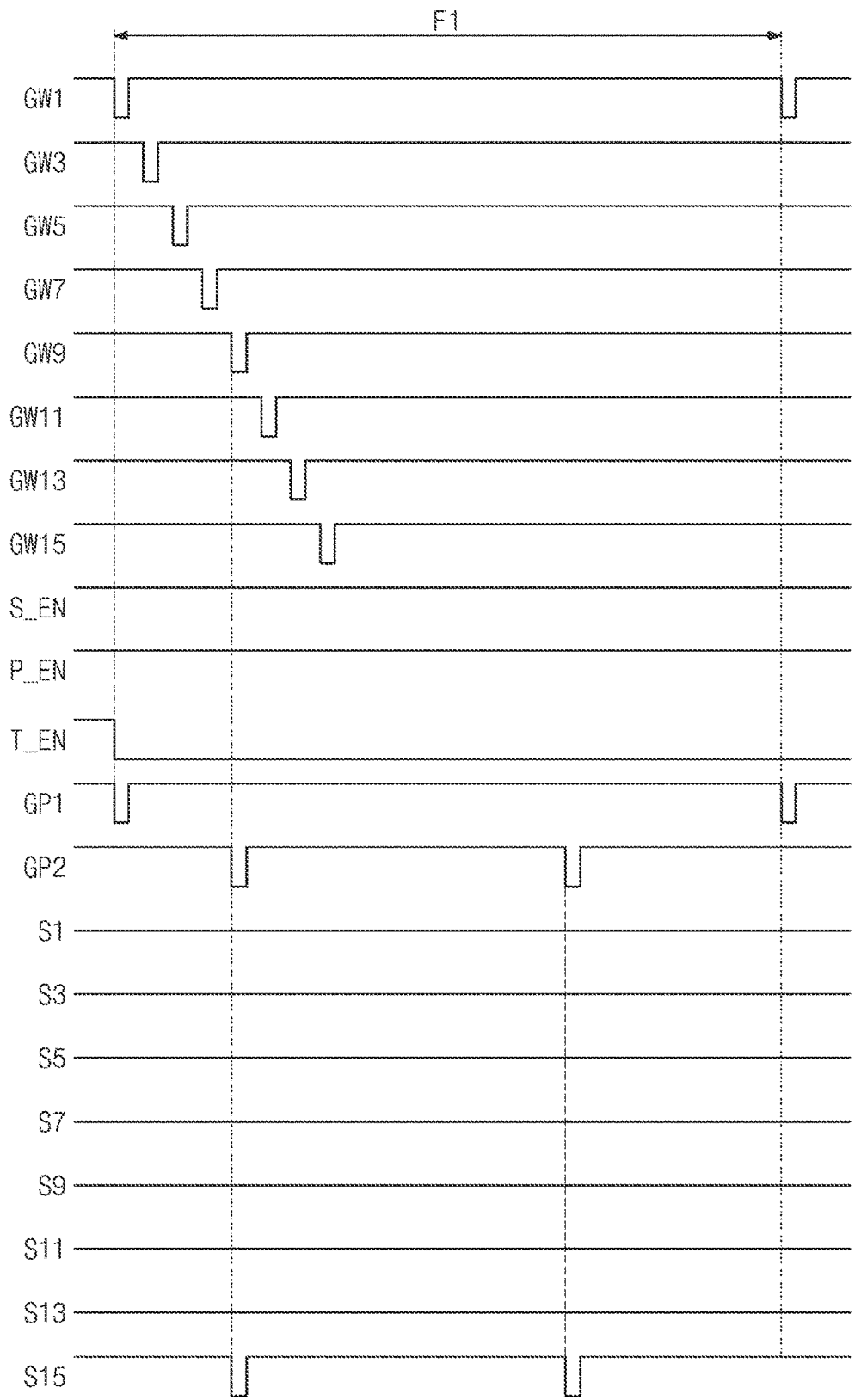
FIG. 20 is a timing diagram for describing an operation of a display panel shown in FIG. 18 in a touch sensing mode.

FIG. 20 is a timing diagram for describing an operation of the display panel DPd shown in FIG. 18 in a touch sensing mode.

Referring to FIGS. 18 and 20, during the one frame F1, the scan signals GW1, GW3, GW5, GW7, GW9, GW11, GW13, and GW15, which are output from the first driver 310d, sequentially transition to low levels.

When each of the first enable signal S_EN and the second enable signal P_EN is at an inactive level (e.g., a high level) in the touch sensing mode, all of the first to seventh switches SW1 to SW7 are turned off. Each of the sensor scan signals S1, S3, S5, S7, S9, S11, and S13 output from the switches SW1 to SW7 may be in a floating state.

The third enable signal T_EN is at an active level (e.g., a low level) in the touch sensing mode, and thus, the switch SW8d outputs the group sensor signal GP2 output from the second driver 322d as the sensor scan signal S15.

In an embodiment, a frequency of the group sensor signal GP2 is higher than that of each of the scan signals GW1, GW3, GW5, GW7, GW9, GW11, GW13, and GW15. For example, when the frequency of each of the scan signals GW1, GW3, GW5, GW7, GW9, GW11, GW13, and GW15 is 120 Hz, the frequency of the group sensor signal GP2 may be 240 Hz. In other words, during the one frame F1, each of the scan signals GW1, GW3, GW5, GW7, GW9, GW11, GW13, and GW15 may be activated at a low level once, and the group sensor signal GP2 may be activated twice at a low level.

The sensor scan signal S15 output from the switch SW8d is the same as the group sensor signal GP2. In other words, a frequency of the sensor scan signal S15 is higher than that of each of the scan signals GW1, GW3, GW5, GW7, GW9, GW11, GW13, and GW15.

An area where a part of a user's body such as the user's hand US_F (see FIG. 1) contacts the display device DD (see FIG. 1) may be several square millimeters (mm²). Accordingly, even when only the small number of sensors FX operates as compared to a fingerprint sensing mode, the display panel DPd may normally execute the touch sensing mode.

In examples shown in FIGS. 18 and 20, in the touch sensing mode, the sensor scan signal S15 is provided to only the sensor FX in the fifteenth row ROW15 among the first to fifteenth rows ROW1, ROW3, ROW5, ROW7, ROW9, ROW11, ROW13, and ROW15.

That is, in the touch sensing mode, only ⅛ of the sensors FX among the plurality of sensors FX positioned in the display panel DPd operate. Instead, the frequency of each of sensor scan signals provided to the sensors FX thus operating is higher than that in a fingerprint sensing mode. Accordingly, touch sensitivity may be increased in the touch sensing mode.

Figure 21:
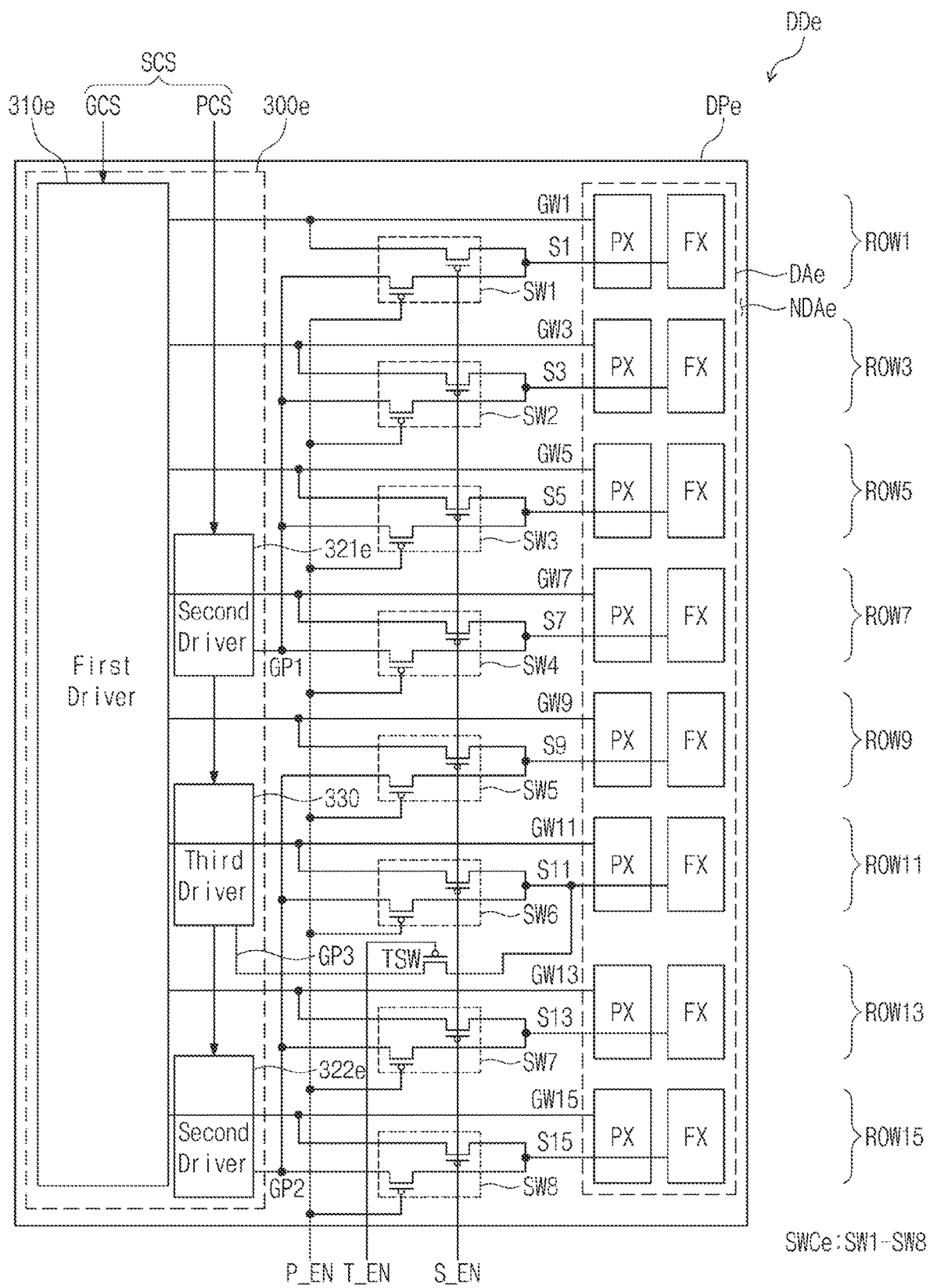
FIG. 21 is a block diagram showing a display device, according to an embodiment of the present disclosure.

FIG. 21 is a block diagram showing a display device DDe, according to an embodiment of the present disclosure.

Referring to FIG. 21, the display device DDe includes the pixels PX, the sensors FX, a scan and sensor driver 300e, a switching circuit SWCe, and a touch mode switch TSW disposed on a display panel DPe. In an embodiment, the pixels PX and the sensors FX may be positioned in a display area DAe of the display panel DPe, and the scan and sensor driver 300e, the switching circuit SWCe, and the touch mode switch TSW may be positioned in a non-display area NDAe. The scan and sensor driver 300e includes a first driver 310e, second drivers 321e and 322e, and a third driver 330.

The display device DDe shown in FIG. 21 includes a configuration similar to that of the display device DDc shown in FIG. 14. For convenience of explanation, a further description of components and technical aspects previously described with reference to the display device DDc shown in FIG. 14 may be omitted.

Referring to FIG. 21, the switching circuit SWCe receives the scan signals GW1, GW3, GW5, GW7, GW9, GW11, GW13, and GW15 output from the first driver 310e, the group sensor signals GP1 and GP2 output from the second drivers 321e and 322e, and a touch sensor signal GP3 output from the third driver 330, and outputs the sensor scan signals S1, S3, S5, S7, S9, S11, S13, and S15 in response to the first, second, and third enable signals S_EN, P_EN, and T_EN. The sensor scan signals S1, S3, S5, S7, S9, S11, S13, and S15 may be provided to the sensors FX, respectively.

The switching circuit SWCe includes switches SW1 to SW8. When the first enable signal S_EN is at an active level (e.g., a low level), each of the switches SW1 to SW8 operates in the same way as the switches SW1 to SW7 shown in FIG. 14. That is, in response to the first enable signal S_EN of an active level, the switches SW1 to SW8 transmit the scan signals GW1, GW3, GW5, GW7, GW9, GW11, GW13, and GW15 output from the first driver 310e as the sensor scan signals S1, S3, S5, S7, S9, S11, S13, and S15.

When the second enable signal P_EN is at an active level (e.g., a low level) in a blood pressure sensing mode, each of the switches SW1 to SW4 outputs the group sensor signal GP1, which is output from the second driver 321e, as the sensor scan signals S1, S3, S5, and S7. When the second enable signal P_EN is at an active level (e.g., a low level), each of the switches SW5 to SW8 outputs the group sensor signal GP2, which is output from the second driver 322e, as the sensor scan signals S9, S11, S13, and S15.

When each of the first enable signal S_EN and the second enable signal P_EN is at an inactive level (e.g., a high level), all of the first to eighth switches SW1 to SW8 are turned off.

When the third enable signal T_EN is at an active level (e.g., a low level) in the touch sensing mode, the touch mode switch TSW outputs the touch sensor signal GP3 output from the third driver 330 as the sensor scan signal S11.

An operation of the display panel DPe shown in FIG. 21 in a fingerprint sensing mode may be the same as that of the display panel DPc (see FIG. 14) described with reference to FIG. 16.

An operation of the display panel DPe shown in FIG. 21 in a blood pressure sensing mode may be the same as that of the display panel DPc (see FIG. 14) described with reference to FIG. 17.

Figure 22:
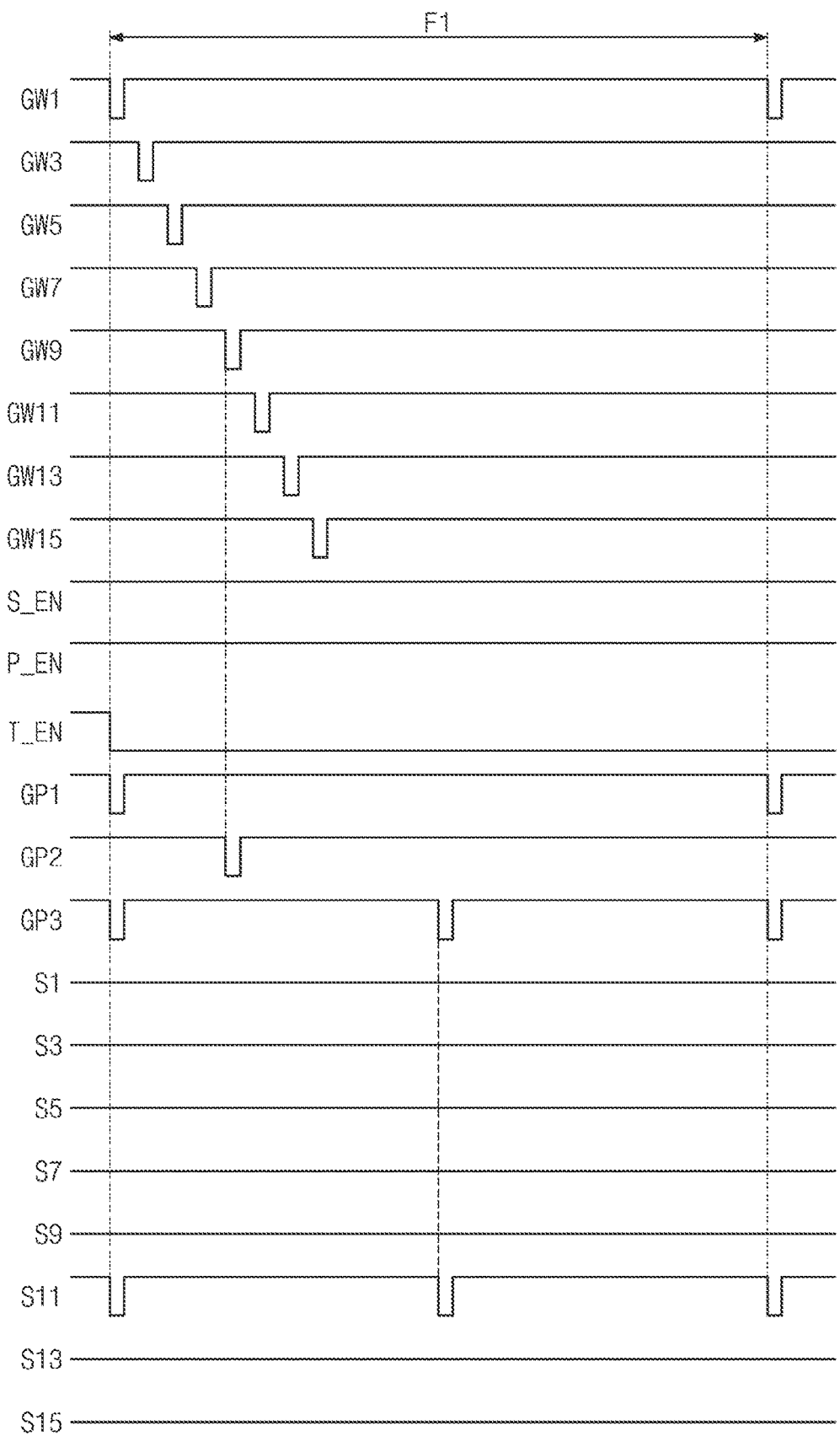
FIG. 22 is a timing diagram for describing an operation of a display panel shown in FIG. 21 in a touch sensing mode.

FIG. 22 is a timing diagram for describing an operation of the display panel DPe shown in FIG. 21 in a touch sensing mode.

Referring to FIGS. 21 and 23, during the one frame F1, the scan signals GW1, GW3, GW5, GW7, GW9, GW11, GW13, and GW15, which are output from the first driver 310e, sequentially transition to low levels.

When each of the first enable signal S_EN and the second enable signal P_EN is at an inactive level (e.g., a high level) in the touch sensing mode, all of the first to seventh switches SW1 to SW8 are turned off. Each of the sensor scan signals S1, S3, S5, S7, S9, S11, S13, and S15 output from the switches SW1 to SW8 may be in a floating state.

The third enable signal T_EN is at an active level (e.g., a low level) in the touch sensing mode, and thus, the touch mode switch TSW outputs the touch sensor signal GP3 output from the third driver 330 as the sensor scan signal S11.

In an embodiment, a frequency of the touch sensor signal GP3 output from the third driver 330 is higher than that of each of the scan signals GW1, GW3, GW5, GW7, GW9, GW11, GW13, and GW15. For example, when the frequency of each of the scan signals GW1, GW3, GW5, GW7, GW9, GW11, GW13, and GW15 is 120 Hz, the frequency of the touch sensor signal GP3 may be 240 Hz. In other words, during the one frame F1, each of the scan signals GW1, GW3, GW5, GW7, GW9, GW11, GW13, and GW15 may be activated at a low level once, and the touch sensor signal GP3 may be activated twice at a low level.

The sensor scan signal S11 output from the touch mode switch TSW is the same as the touch sensor signal GP3. In other words, a frequency of the sensor scan signal S11 is higher than that of each of the scan signals GW1, GW3, GW5, GW7, GW9, GW11, GW13, and GW15. Accordingly, even when only the small number of sensors FX operates as compared to a fingerprint sensing mode, the display panel DPd may normally execute the touch sensing mode.

The second driver 322d shown in FIG. 18 changes the frequency of the group sensor signal GP2 depending on an operating mode. The second driver 322e shown in FIG. 21 outputs the group sensor signal GP2 of a constant frequency regardless of the operating mode.

FIG. 21 shows that the touch mode switch TSW outputs the touch sensor signal GP3 output from the third driver 330 as the sensor scan signal S11, but the present disclosure is not limited thereto. For example, the touch mode switch TSW may output the touch sensor signal GP3, which is output from the third driver 330, as one of the sensor scan signals S1, S3, S5, S7, S9, S11, S13, and S15 according to embodiments.

Sensors of a display device having such a configuration may detect not only a fingerprint, but also biometric information such as a user's blood pressure. Moreover, the display device may detect an external input (e.g., a user's touch). Accordingly, the display device according to embodiments does not include a separate input sensing layer that senses an external input. In this case, the thickness of the display device may be further reduced. As a result, flexibility may be increased, and thus, the display device may be implemented in various types. For example, the display device may be implemented as a foldable, rollable, or slideable display device described above.

The display device according to embodiments of the present disclosure may simultaneously receive a detection signal from a plurality of sensors by electrically connecting a plurality of sensors. Accordingly, detection performance for biometric information such as the user's blood pressure may be increased.

According to embodiments of the present disclosure, the display device may separately include a scan and sensor driver that drive a pixel and a sensor, a first sensor driver that operates the sensor in a biometric sensing mode, and a second sensor driver that operates the sensor in a touch sensing mode, and may commonly use a switching circuit that provides the sensor with a sensor driving signal output from the first sensor driver and the second sensor driver.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device, comprising:
a plurality of pixels, each comprising a light emitting element;
a plurality of sensors, each comprising a light sensing element and a sensor driving circuit;
a readout circuit configured to receive a sensing signal output from the plurality of sensors; and
a readout line extending in a second direction,
wherein the plurality of sensors comprises:
a plurality of first row light sensing anodes positioned in a first row;
a plurality of second row light sensing anodes positioned in a second row; and
an anode connection line comprising a first portion extending in a first direction, a second portion extending in the second direction which crosses the first direction, and a third portion extending in a third direction which extends obliquely relative to the first and second directions, and electrically connecting y light sensing anodes among the first row light sensing anodes and the second row light sensing anodes with each other, wherein y is a positive integer,
wherein the sensing signal from sensors connected through the anode connection line among the plurality of sensors are transmitted to the readout circuit through the readout line, wherein the anode connection line overlaps the readout line on a plane.

2. The display device of claim 1, wherein the first row light sensing anodes are spaced from each other in the first direction,
wherein the second row light sensing anodes are spaced from each other in the second direction, and
wherein the first row light sensing anodes and the second row light sensing anodes are spaced from each other in the second direction.

3. The display device of claim 2, wherein the plurality of pixels comprises first anodes, second anodes, and third anodes,
wherein the first anodes and the second anodes are positioned between the first row light sensing anodes in the first direction, and
wherein the second anodes are positioned between the first row light sensing anodes and the second row light sensing anodes in the second direction.

4. The display device of claim 1, wherein the sensor driving circuit of each of the plurality of sensors comprises a reset transistor connected between a reset voltage line and a corresponding one among the first row light sensing anodes and the second row light sensing anodes.

5. An electronic device, comprising:
a plurality of pixels, each comprising a light emitting element;
a plurality of sensors, each comprising a light sensing element;
a first driver configured to provide a plurality of scan signals to the plurality of pixels;
a second driver configured to output a group sensor signal to the plurality of sensors,
wherein the group sensor signal comprises a first group sensor signal and a second group sensor signal; and
a switching circuit configured to respectively provide the plurality of scan signals from the first driver to the plurality of sensors during a first mode and to provide the first and second group sensor signals from the second driver to the plurality of sensors during a second mode,
wherein the first group sensor signal is provided to a first group of sequentially disposed sensors among the plurality of sensors and the first group signal is identical to one of the plurality of scan signals provided to the first group of sequentially disposed sensors during the first mode,
wherein the second group sensor signal is provided to a second group of sequentially disposed sensors among the plurality of sensors, which are sequentially disposed after the first group of sequentially disposed sensors, and the second group signal is identical to one of the plurality of scan signals provided to the second group of sequentially disposed sensors during the first mode.

6. The electronic device of claim 5, wherein the plurality of scan signals are different from each other, and
wherein the group sensor signal is identical to one of the plurality of scan signals.

7. The electronic device of claim 5, wherein the switching circuit respectively provides the plurality of scan signals to the plurality of sensors in response to a first enable signal, and provides the group sensor signal to the plurality of sensors in response to a second enable signal.

8. The electronic device of claim 7, wherein the switching circuit comprises a plurality of switches respectively corresponding to the plurality of sensors, and wherein the plurality of switches comprises:
a first switch configured to provide a corresponding scan signal among the plurality of scan signals to a corresponding sensor among the plurality of sensors in response to the first enable signal; and
a second switch configured to provide the group sensor signal to a corresponding sensor among the plurality of sensors in response to the second enable signal.

9. The electronic device of claim 5, wherein a frequency of the group sensor signal is equal to a frequency of each of the plurality of scan signals.

10. The electronic device of claim 5, wherein, during a third mode, the switching circuit provides the group sensor signal to one of the plurality of sensors.

11. The electronic device of claim 10, wherein, during the third mode, a frequency of the group sensor signal is higher than a frequency of each of the plurality of scan signals.

12. The electronic device of claim 10, wherein the first mode is a fingerprint sensing mode for sensing a fingerprint of a user,
wherein the second mode is a blood pressure sensing mode for measuring a blood pressure of the user, and
wherein the third mode is a touch sensing mode for sensing a touch of the user.

13. The electronic device of claim 5, further comprising:
a third driver configured to output a touch sensor signal during a third mode,
wherein, during the third mode, the switching circuit provides the touch sensor signal to one of the plurality of sensors.

14. The electronic device of claim 13, wherein, during the third mode, a frequency of the touch sensor signal is higher than a frequency of each of the plurality of scan signals.

15. The electronic device of claim 5, further comprising:
a display panel divided into a display area and a non-display area,
wherein the plurality of pixels and the plurality of sensors are positioned in the display area of the display panel, and
wherein the first driver, the second driver, and the switching circuit are positioned in the non-display area of the display panel.

16. The electronic device of claim 5, wherein the plurality of sensors comprises:
a plurality of first row light sensing anodes positioned in a first row; and
a plurality of second row light sensing anodes positioned in a second row,
wherein at least two of the first row light sensing anodes are electrically connected through a first anode connection line, and
wherein at least two of the second row light sensing anodes are electrically connected through a second anode connection line.

17. A device, comprising:
a plurality of pixels, each comprising a light emitting element;
a plurality of sensors, each comprising a light sensing element and a sensor driving circuit;
a first driver configured to provide a plurality of scan signals to the plurality of pixels;
a second driver configured to output a group sensor signal to the plurality of sensors,
wherein the group sensor signal comprises a first group sensor signal and a second group sensor signal; and
a switching circuit configured to output the plurality of scan signals as a plurality of sensor scan signals from the first driver to the plurality of sensors during a first mode and to output the first and second group sensor signals as the plurality of sensor scan signals from the second driver to the plurality of sensors during a second mode, wherein the sensor driving circuit of each of the plurality of sensors outputs a sensing signal corresponding to photocharges generated by the light sensing element in response to a corresponding one among the plurality of sensor scan signals, wherein the first group sensor signal is provided to a first group of sequentially disposed sensors among the plurality of sensors and the first group sensor signal is identical to one of the plurality of scan signals provided to the first group of sequentially disposed sensors during the first mode, wherein the second group sensor signal is provided to a second group of sequentially disposed sensors among the plurality of sensors, which are sequentially disposed after the first group of sequentially disposed sensors, and the second group sensor signal is identical to one of the plurality of scan signals provided to the second group of sequentially disposed sensors during the first mode.

18. The device of claim 17, wherein the plurality of scan signals are different from each other.

19. The device of claim 17, wherein the sensor driving circuit of each of the plurality of sensors comprises:

a first transistor connected between a reset voltage line and a first sensing node;

a second transistor connected between a sensor driving voltage line and a second sensing node and comprising a gate electrode connected to the first sensing node; and a third transistor connected between the second sensing node and a readout line and comprising a gate electrode that receives a corresponding one among the plurality of sensor scan signals, and wherein an anode of the light sensing element is connected to the first sensing node.

20. The device of claim 19, wherein the plurality of sensors comprise a first sensor and a second sensor, and wherein the first sensing node of the first sensor and the first sensing node of the second sensor are connected in common.

* * * * *